United States Patent [19]

Heneghan et al.

[11] 3,771,136

[45] Nov. 6, 1973

[54] CONTROL UNIT

[75] Inventors: Michael J. Heneghan, Winchester; Michael A. Hughes, Chandlers Ford, both of England

[73] Assignee: International Business Machines Corporation, Armonk, N.Y.

[22] Filed: Apr. 29, 1971

[21] Appl. No.: 138,428

[30] Foreign Application Priority Data

May 20, 1970 Great Britain .................. 24,312/70

[52] U.S. Cl. .......................................... 340/172.5
[51] Int. Cl. .......................................... G06f 9/12
[58] Field of Search .............................. 340/172.5

[56] References Cited

UNITED STATES PATENTS 3,675,209 7/1972 Trost et al. ...................... 340/172.5

*Primary Examiner*—Harvey E. Springborn
*Attorney*—Hanifin & Jancin and John C. Black

[57] ABSTRACT

A significant cost savings is effected in a magnetic disk file control unit with a minimum loss in performance by producing a sequence of control signals, hereinafter referred to as mini-ops, for each of a large number (e.g., 39) of available file commands (often referred to as CCWs). Each mini-op is common to a large number of the commands, and it controls an integrated control unit (adaptor) or channel control unit during portions of Read, Write and Search CCW executions. The preferred embodiment of the improved control unit has been particularly adapted for use with a microprogrammed processor and each sequence of mini-ops is produced by the microprogram. A count is formed with each mini-op; and, when predetermined count values are achieved in the control unit, they selectively initiate required microprogram interrupts and/or control unit control functions. There are only four mini-ops, namely: Read Data, Write Data, Write Gap, and No-Op. A mini-op is issued for each field which is to be read or written and for each gap which is to be written. No-Ops are issued as required. Prior art control units included very complex and expensive channel or adaptor hardware to decode each of the 39 commands or CCWs transferred under microprogram control from control store associated with the processor to the channel or adaptor. The use of the mini-ops simplifies and reduces substantially the hardware, yet it does not result in any appreciable degradation of the processing system.

4 Claims, 20 Drawing Figures

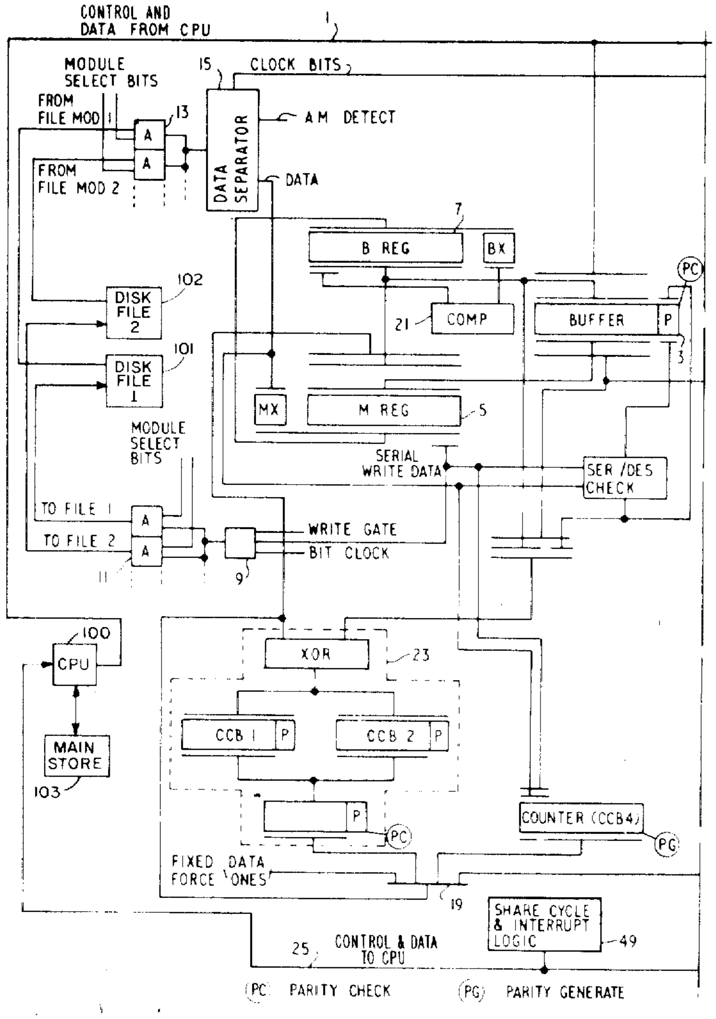

CONTROL AND DATA FROM CPU
MODULE SELECT BITS
CLOCK BITS
FROM FILE MOD 1
FROM FILE MOD 2
A
A
DATA SEPARATOR
AM DETECT
DATA
B REG
BX
COMP
BUFFER
P
DISK FILE 2
DISK FILE 1
MX
M REG
MODULE SELECT BITS
SERIAL WRITE DATA
SER /DES CHECK
TO FILE 1
TO FILE 2
WRITE GATE
BIT CLOCK
CPU
MAIN STORE
XOR
CCB 1
CCB 2
COUNTER (CCB4)
FIXED DATA
FORCE 'ONES'
SHARE CYCLE & INTERRUPT LOGIC
CONTROL & DATA TO CPU
PC PARITY CHECK
PG PARITY GENERATE

INVENTORS: MICHAEL J. HENEGHAN
MICHAEL A. HUGHES

BY John C Black
ATTORNEY

FLOW CHART No 1b

FLOW CHART No 7

FLOW CHART No. 5

FLOW CHART No 6

CONTROL UNIT

BACKGROUND OF THE INVENTION

Serial data storage apparatus such as disk files may be connected to a processing unit by means of a separate input/output control unit or may be integrated within the processing unit (CPU) so that a separate control unit is not required. In the latter case the control unit, called a disk attachment or adapter, is entirely within the CPU and makes use of the CPU registers and microprogram for its operation. The attachment includes registers and timing controls required to operate the disk files. The attachments eliminate the need for channel controls which are required when a file is controlled by a separate input/output control unit which is connected by a channel to the processing unit. Operations with an attachment are programmed in the same manner as I/O devices connected to a system channel.

Input/output operations are initiated and controlled by information with two types of formats: instructions and commands. Instructions decoded by the CPU are part of the CPU program. Both instructions and commands are fetched from main storage. Functions which are peculiar to a disk file, e.g., the positioning of the access mechanism are specified by commands. Commands are decoded and executed by I/O devices.

Previously, data storage apparatus of the type storing a plurality of serially accessed data records were controlled over each individual record by a control unit using one command. Since each record consists of a number of fields of varying length, each field having a different function, the control unit proved to be complex and expensive.

SUMMARY OF THE INVENTION

The present invention provides a control unit for a data storage apparatus of the type storing a plurality of data records, each record having a plurality of serially accessed fields and each field consisting of a plurality of data groups, in which in operation, the control unit is adapted to receive from a processing unit a sequence of control signals (for each command) for controlling the apparatus, in which the apparatus is controlled over each field or an area of each field by a different one of the signals of a sequence, which one signal (or mini-op) specifies the operation to be performed on that field or the area of that field and contains a count, which count is decremented as each data group of that field or the area of that field is operated upon and in which at given values of the count given functions of the storage apparatus are effected.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIGS. 3, 3*a*–3*d*, and 4–10 include flow charts 1*a*–1*d*, and 2–8 illustrating CPU microprogram routines for generating and executing mini-op sequences.

DESCRIPTION OF A PREFERRED EMBODIMENT

Figures 1, 1A:
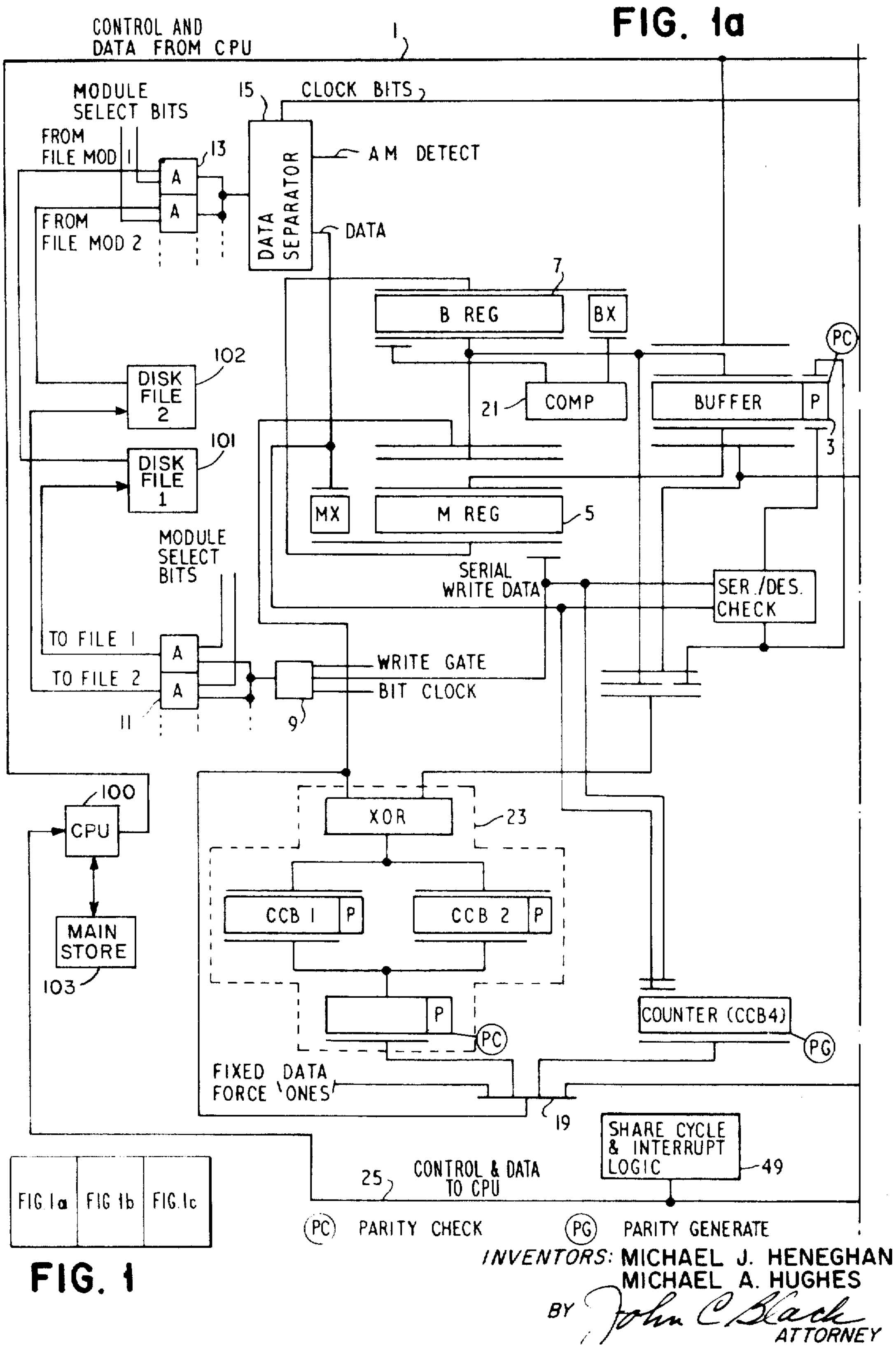
FIGS. 1, 1*a*, 1*b*, and 1*c* diagrammatically illustrate the improved mechanism for controlling a disk file.

The CPU 100 initiates I/O operations with the instruction START I/O. This instruction identifies the disk file 101 or 102 and fetches a channel address word (CAW) from a fixed location in main storage 103. The CAW contains the protection key and designates the location in the main storage from which a channel command word (CCW) is fetched. The CCW specifies the command to be executed and the storage area, if any, to be used. The results of an attempt to initiate execution of a command are indicated by the setting of a condition code in the program status word (PSW) of the CPU and, under certain conditions, by storing pertinent information in a channel status word (CSW). A more detailed description of Input/Output operations is given in the IBM System/360 Principles of Operation, A22-6821, dated Jan. 13, 1967 (IBM is a Registered Trademark).

An I/O operation may involve transfer of data to one storage area designated by a single CCW, or to a number of non-contiguous storage areas designated by a list of CCWs, each CCW indicating a contiguous area of storage. The CCW are coupled by data chaining, that is, each CCW has a flag which causes another CCW to be fetched. Termination of the I/O operation is normally indicated by a device end signal or a channel end condition. The channel end condition indicates that the I/O device has received or provided all information associated with the operation and no longer needs channel facilities. The device-end condition indicates that the device has terminated execution of the operation. The device and channel end conditions can occur concurrently.

Where the disk adapter (FIGS. 1*a*–1*c*) is integrated with the CPU the CAW, the CCWs, the CSW and PSW perform identical functions, where applicable, to those assigned for channel connected control units. The integrated control unit or adapter is addressed as if it were connected to a channel.

The CPU is preferably controlled by microprogramming and the I/O instructions and the commands are carried out by means of the CPU microprogram. The microprogram is also used for trap routines to enter new commands while in chaining and for interrupt routines. As will be explained later, the microprogram does not completely control execution of the actual commands.

Data transfer to or from the file takes place on a time-share basis while other microprogram routines are being performed by the CPU. A data byte is transferred during a forced share cycle. For any operating condition, the file has priority for its data transfers and should never overrun unless the CPU goes into the hard stop condition.

A suitable disk file is the IBM 2314 with an IBM 2316 disk pack providing the storage media (IBM is a Registered Trademark). Each 2316 disk pack has 20 recording surfaces on which records can be written. Each disk surface has 203 concentric tracks for data (only 200 tracks are normally active). Twenty read/write heads are arranged on the 2314 which can be simultaneously aligned with the same numbered track on each disk surface. These 20 tracks are referenced as a cylinder for addressing (seek location). The cylinder number and the head number define a specific track.

Data is recorded on the file serial by byte and serial by bit starting with bit 0. In addition to the data, clock bits from a write clock are written onto the track. This allows a synchronized clock to be developed during subsequent read operations. The clock bits provide a continuous pattern that defines the data cells. The data 1-bits are written midway between the clock bits as a change in magnetic field. No change takes place for 0-bits. The eight bits of each succesive byte are written as a continuous pattern without separation or extra bits as markers.

The CPU parity bits in data bytes are not written, instead a two- or four-byte cyclic code check bytes (CCBs) are developed for each field (as will be described later) from the data bit configuration while writing data. The CCBs are written following the data and are composed with the cyclic code developed during subsequent reading of the field to verify the data. A parity bit generator develops a parity bit for all bytes having an even bit count when data is read into the CPU. A further two CCBs may be provided. One byte provides a bit count for the field and the other byte indicates whether the bit count is to be checked.

Figure 2A:
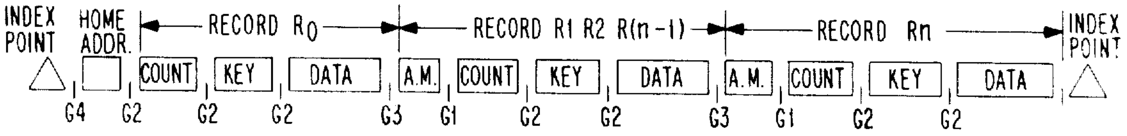
FIGS. 2*a*–2*e* illustrate the format of records on a disk file.

A track is the smallest addressable area on the file. The track may have several records that can be read out selectively through programming. The starting point for all tracks on the file is a fixed index point as shown in FIG. 2*a*.

The first recorded area on the track following the index point is the home address field (HA) that defines the address of the track. This is followed by record 0 (RO) that contains the program track descriptor record. The track may have one or more data records (R1–Rn). The number of records that can be recorded on a track depends on the number of bytes. The identifiers, data and gaps must total less than 7,294 bytes.

The discussion of the track format is based on the initial writing of the record structure. The recorded data when rewritten in part has an identical format, but the gaps between records and fields may vary slightly. The variation is in part due to the rewrite of the clcok bits. Also involved are variations in clock oscillator speed and disk speed. This is one reason for having a gap between each portion of the record. The second reason is to provide time for the microprogram to obtain a new command in a chain sequence. What is initially defined as a simple gap is composed of two or more sections.

Figure 2B:
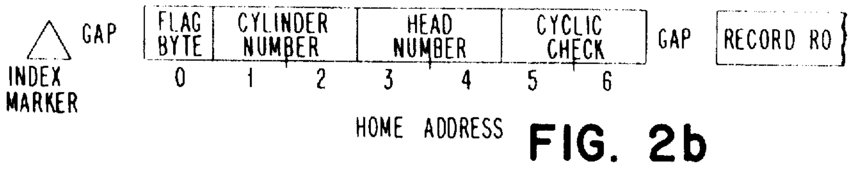

Each track has a written field (Home Address) at the start that defines the track address and the track condition, as seen in FIG. 2*b*. This area is available through the commands to write, read or search "Home Address." The home address is written after a 73-bite gap (HA gap) from the index point. The first 65-bites are written with ones during the "inter-record zone" and serves to overcome any variation in the relationship between the index point and the heads on the 2314. The remaining eight-bytes of the gap are written during the "prerecord zone." This area consists of four bytes of zeros followed by one byte of FF(1111 1111), two AM bytes and one of OD(0000 1101). The latter byte serves to synchronize the clock with the data to be read.

The record portion of the home-address field contains five bytes followed by the two-byte or four-byte cyclic code (CCBs) for the field. The Flag byte, byte 0, indicates the track condition, i.e., whether the track is defective. Record RO indicates the address of an alternative track. Bytes 1 and 2 contains the cylinder number and bytes 3 and 4 the head number.

Figure 2C:
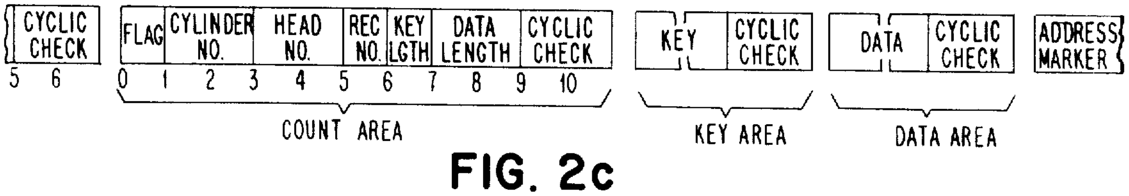

Record zero (RO) is the first information record on the track. It is normally used as a track descriptor in programming systems. The track descriptor record is shown in FIG. 2*c*. When used as a track descriptor, the data area contains the identifier of the last record on the track and the number of bytes remaining unused on the track. If the track is defective RO contains the address of the alternative track. RO can be used for the first information on the track when not used as a track descriptor.

RO contains three fields as do subsequent records R1 to Rn. The fields are Count, Key, and Data. The inter record gap between the HA field and the count field of RO contains 43 bytes. The first 35 bytes are FF and are a post record zone of the HA field that provides time for entry of the next command by the microprogram. The last eight bytes of the gap are a "prerecord zone" of the count field and consists of four bytes of zeros, one byte of FF, two AM bytes and one byte of OB. The latter byte serves to synchronize the clock to the data. The count field contains nine bytes followed by two or four CCB's. The nine comprise: byte 0, HA flag byte, bytes 1 and 2 cylinder No; bytes 3 and 4 head No; byte 5 record No; byte 6 key length and bytes 7 and 8 data length.

The cylinder, head and record portion of the count field compose the identifier used to locate a specific record with the search command. The key field contains the number of bytes specified by the key length byte in the count field (maximum 255 bytes) followed by two or four CCBs. If the key length in the count field is zero, the key field is not written and no space is allowed for the field and the normal gap. When the key field is written a gap of 41 bytes is written between the CCBs of the count field and the start of the key field information. The first 33 bytes are the post record zone of the count field that provides time for the entry of the next command by the microprogram. The area contains 33 bytes of FF. The last eight bytes of the gap are the prerecord zone of the key field which consists of four bytes of zeros and one byte of FF, two AM bytes and one byte of OA (sync byte).

The key field comes from the CPU storage during a write operation. This information is usually some portion of the data field that identifies the record, e.g., by man, order or account number. A search of this area may be used for positive identification of the record.

The data field contains the number of bytes specified by the data length bytes in the count field followed by two or four CCBs developed for this field. A gap of 41 bytes is written between the CCBs of either the count field or the key field and the start of the data field information. The first 33 bytes of the gap are prerecord zone of the data field (or key field) that provides time for entry of the next command by the microprogram. The area contains 33 bytes of FF. The last eight bytes of the gap are the prerecord zone of the data field and consist of four bytes of zeros, one byte of FF, two AM bytes and one byte of 09 (sync byte).

Figure 2D:
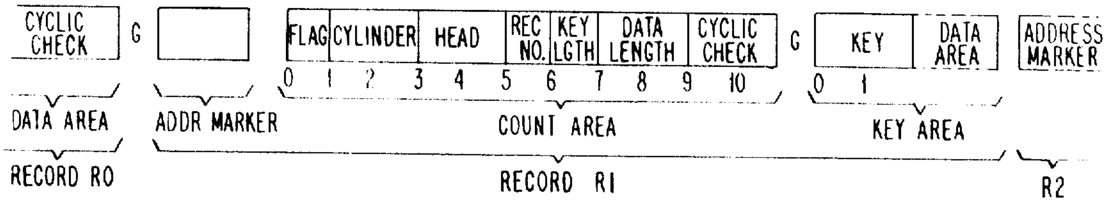
Figure 2E:
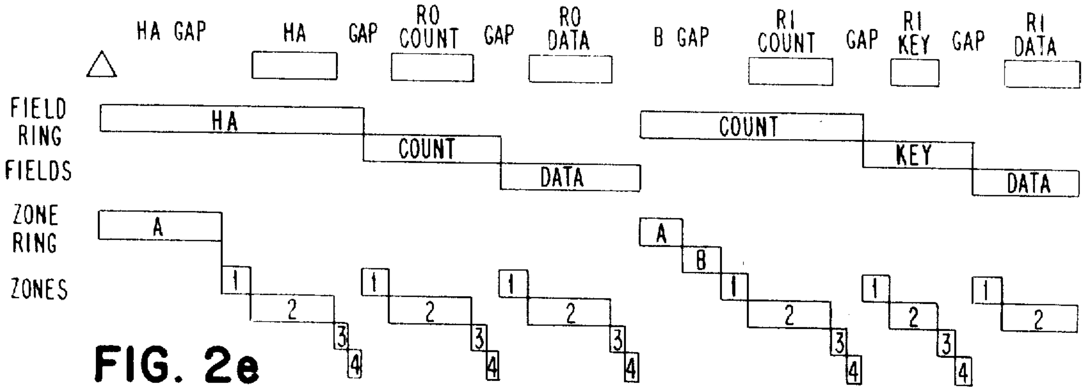
Figure 3A:
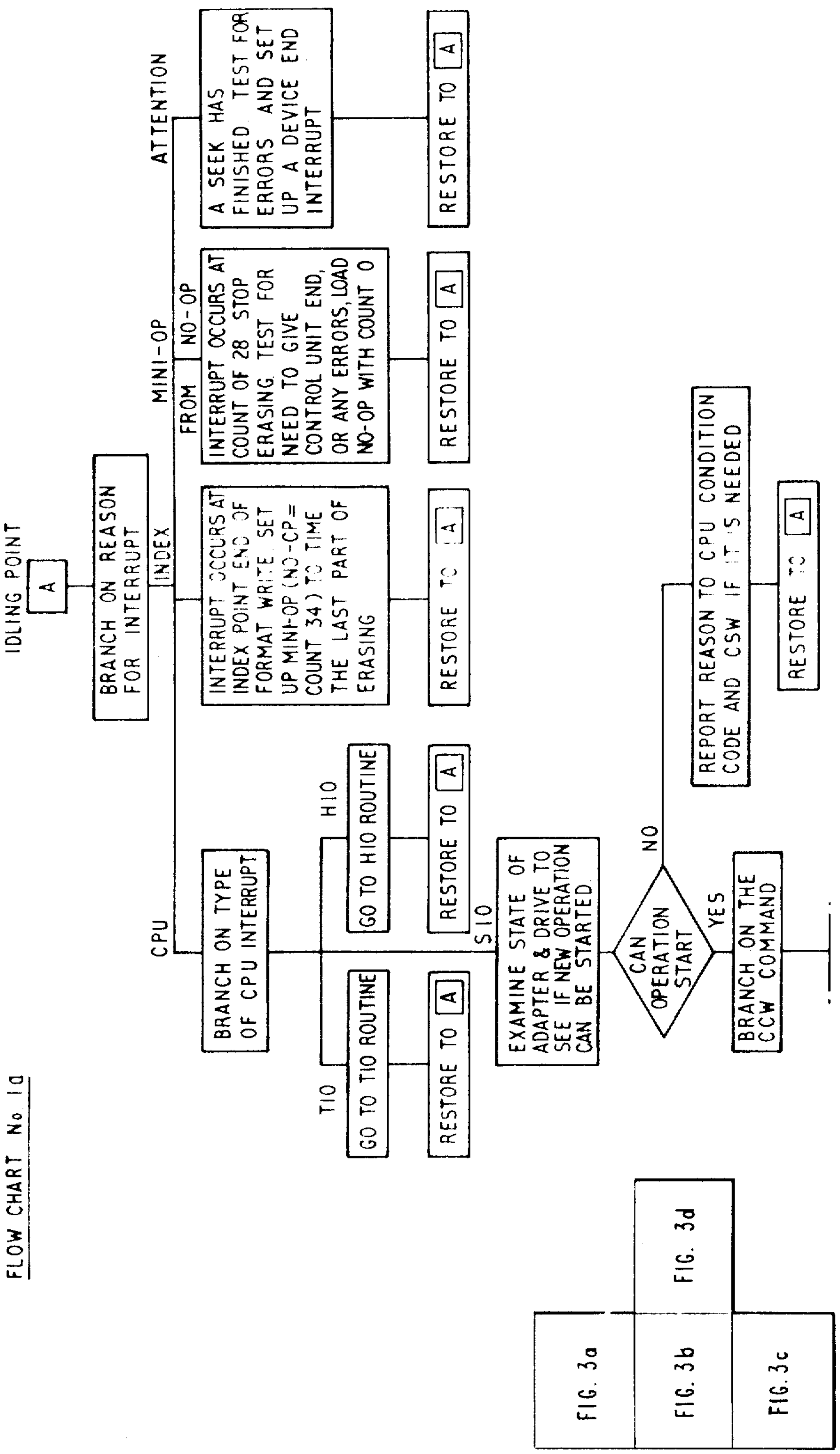
Figure 3B:
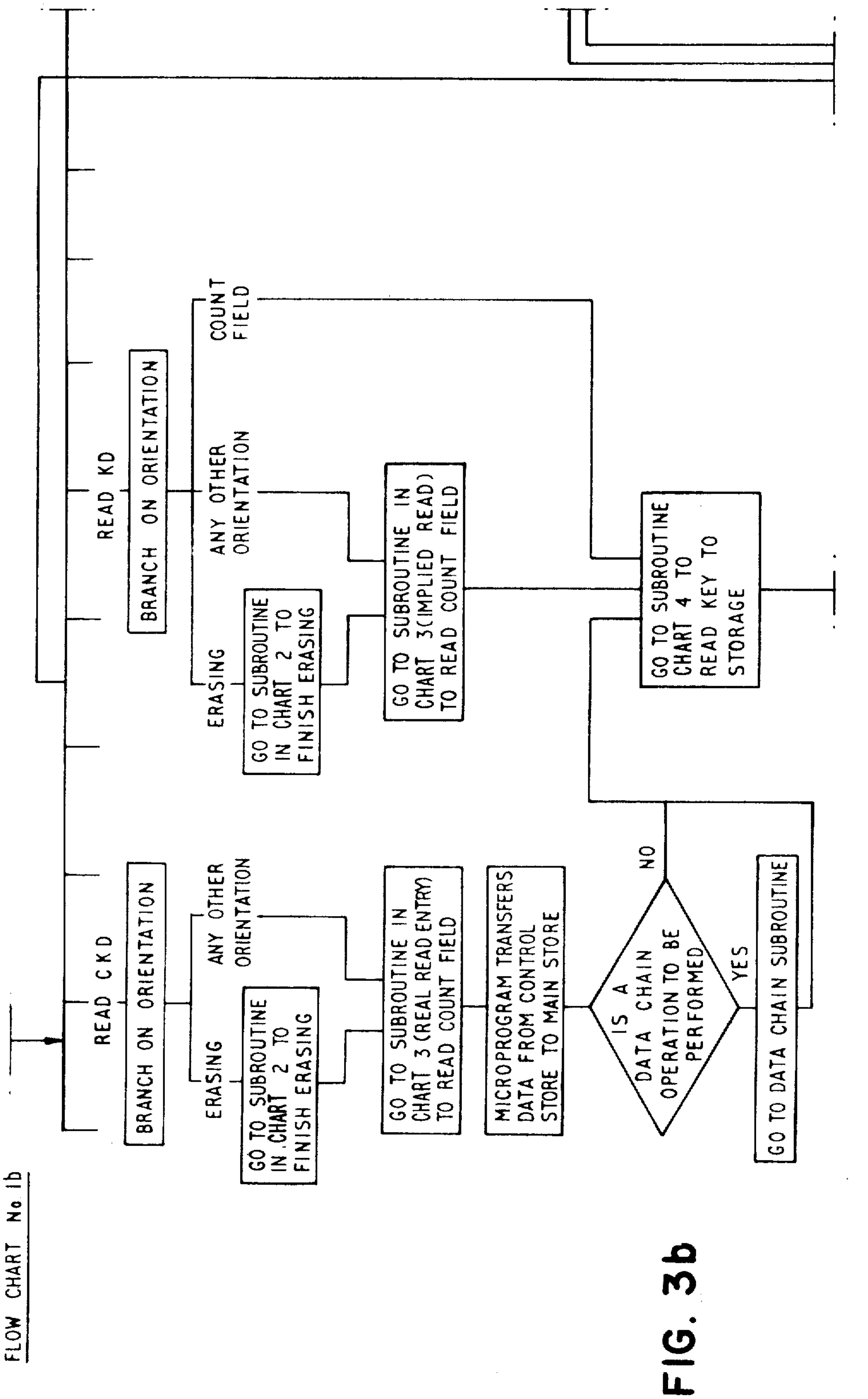
Figure 3C:
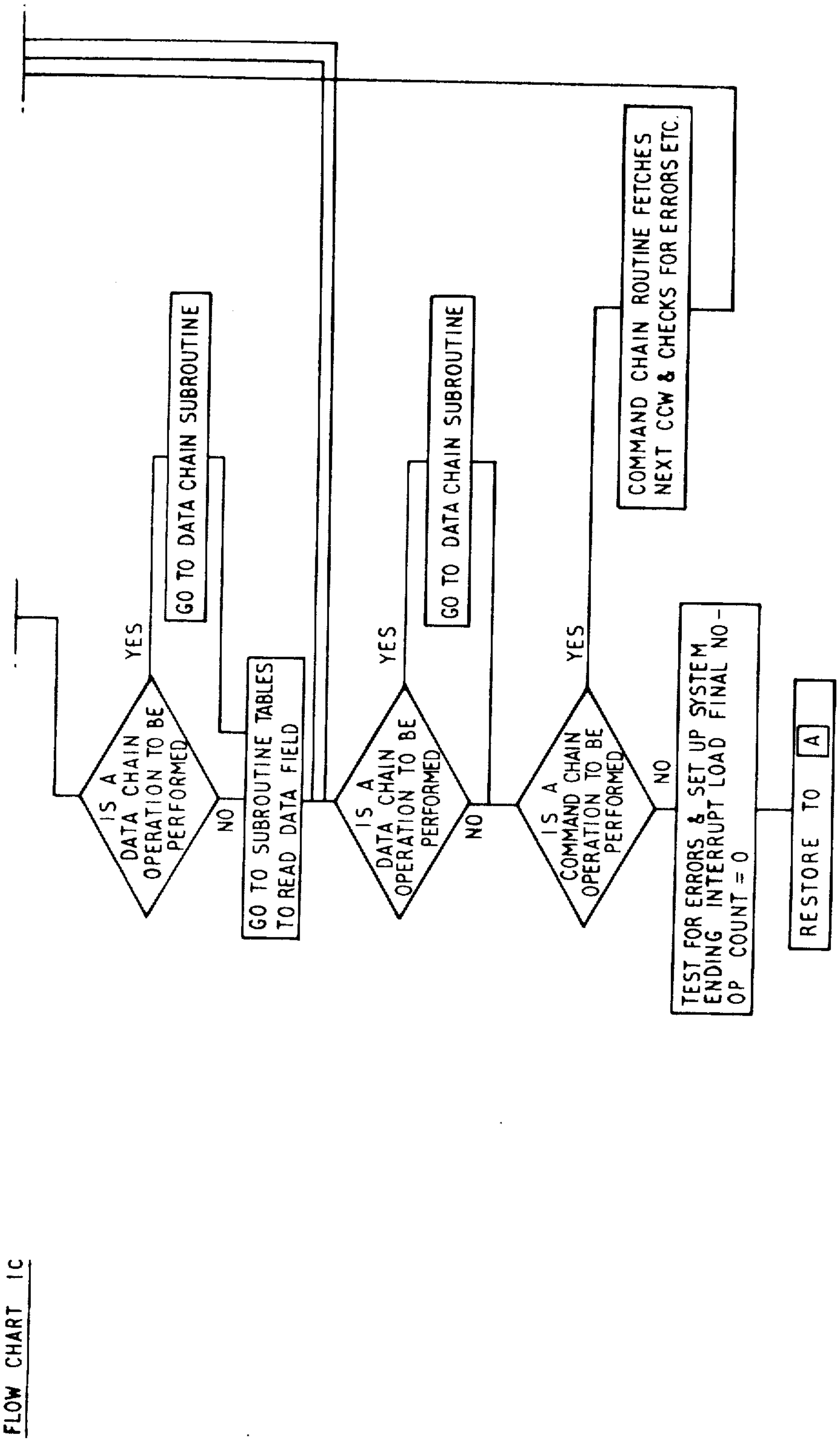
Figure 3D:
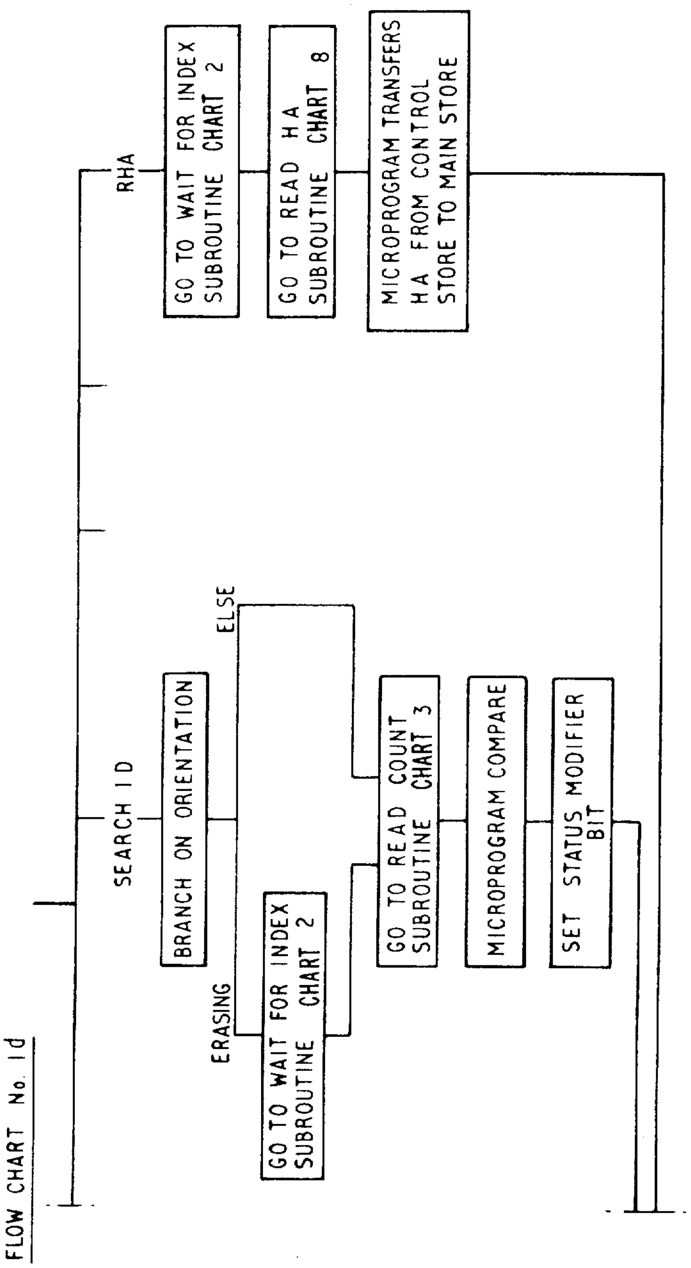
Figure 4:
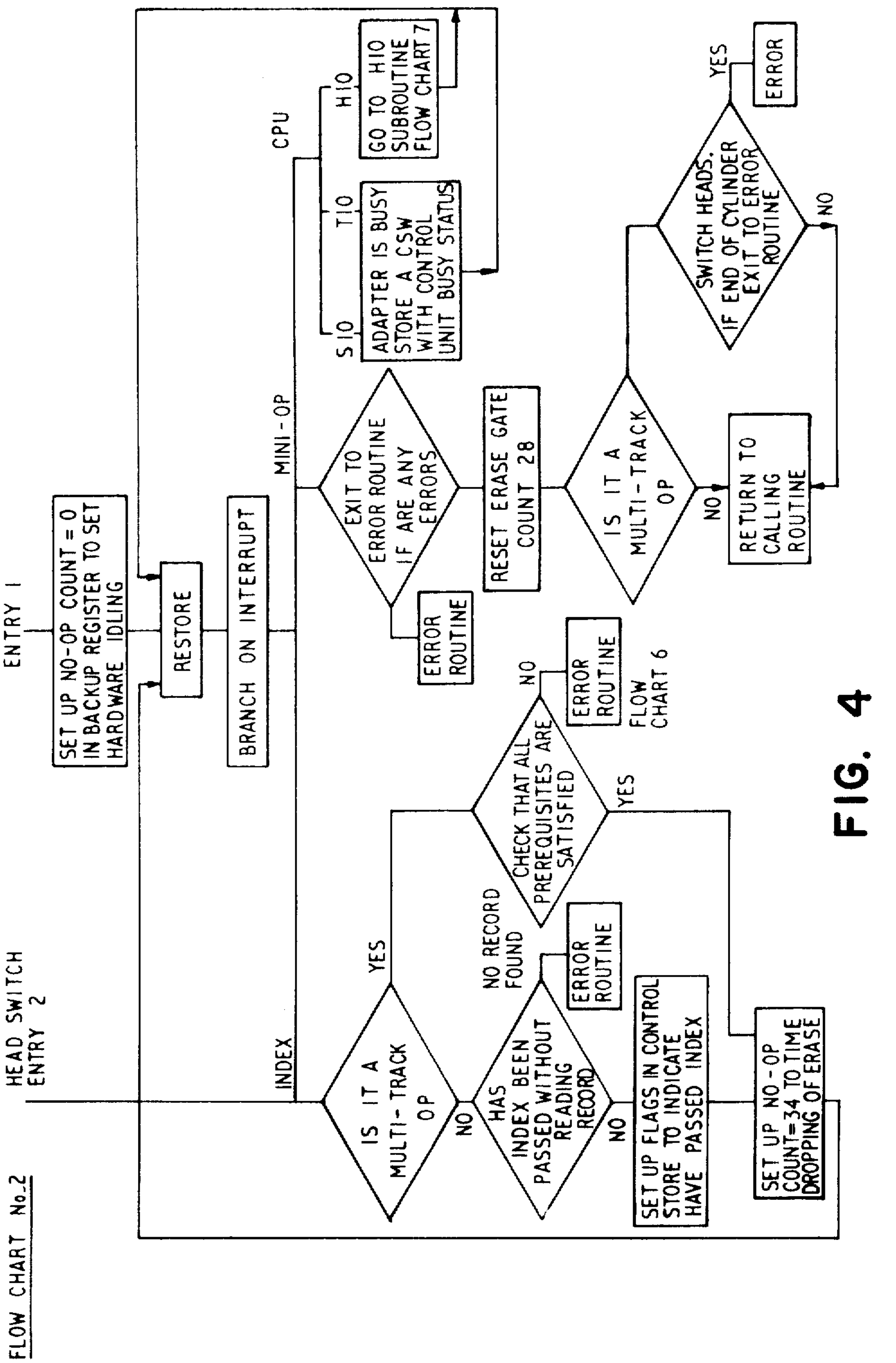
Figure 5:
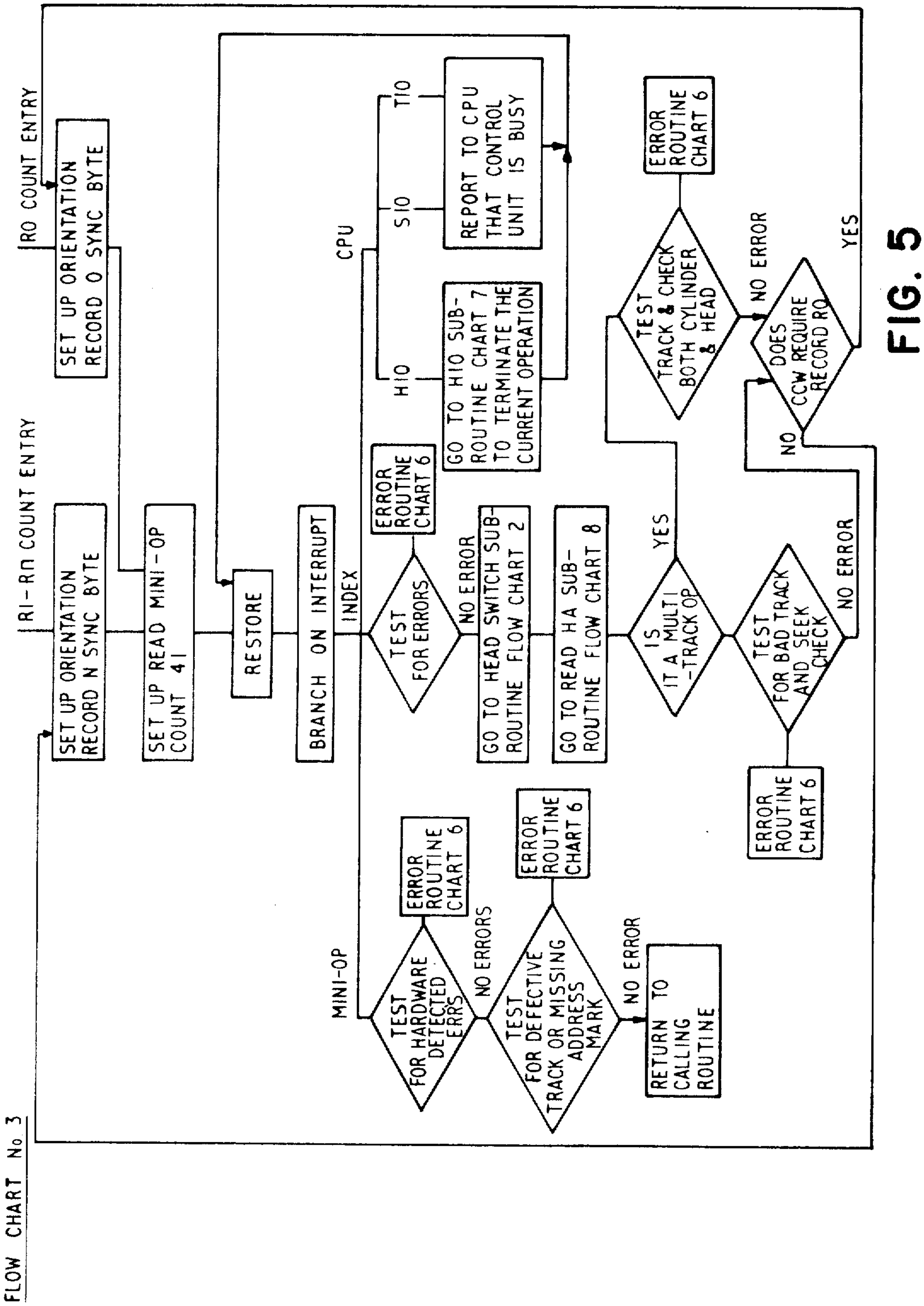
Figure 6:
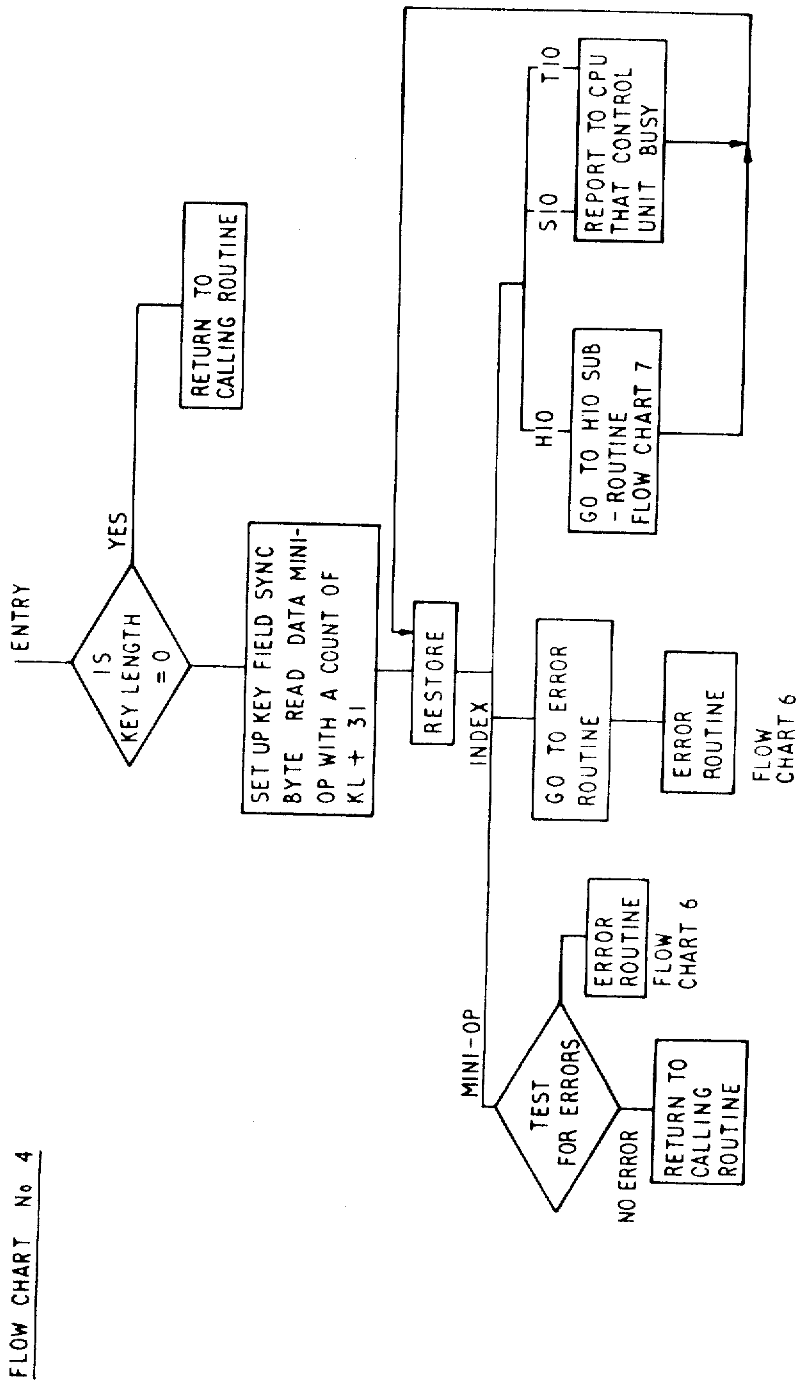
Figure 9:
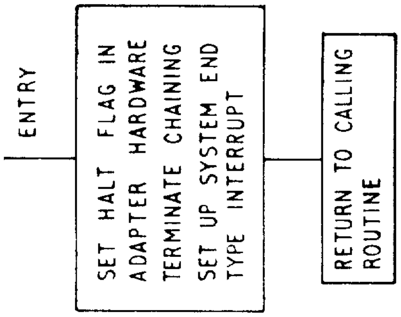
Figure 7:
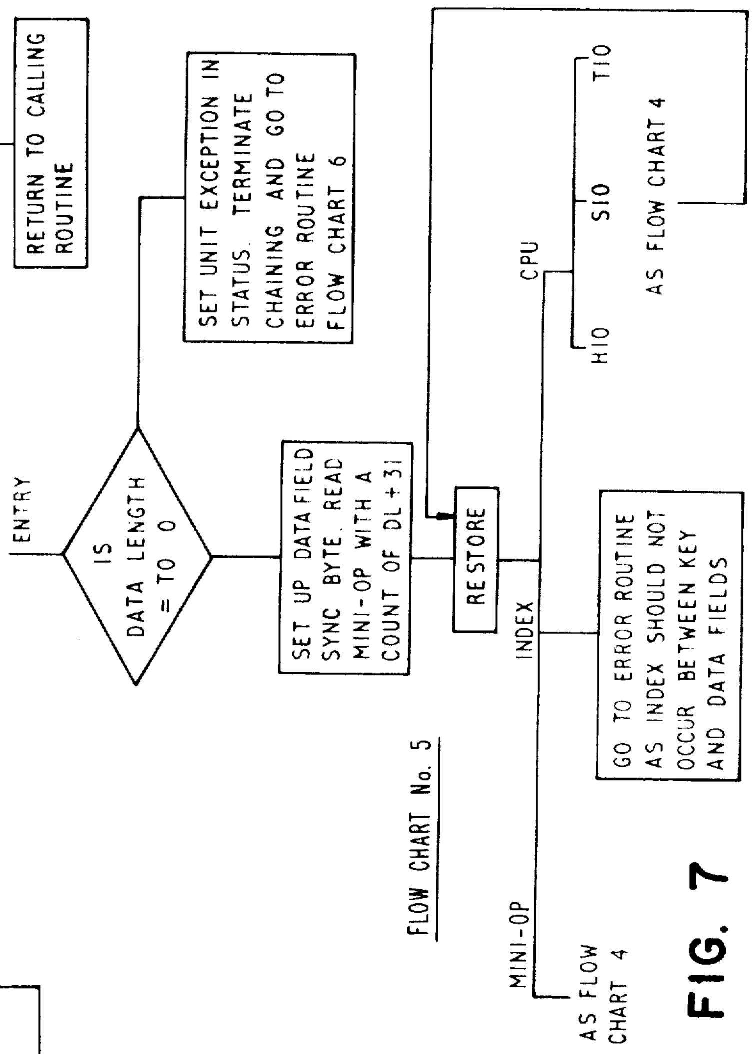
Figure 8:
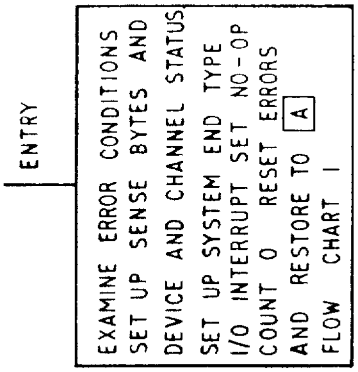
Figure 10:
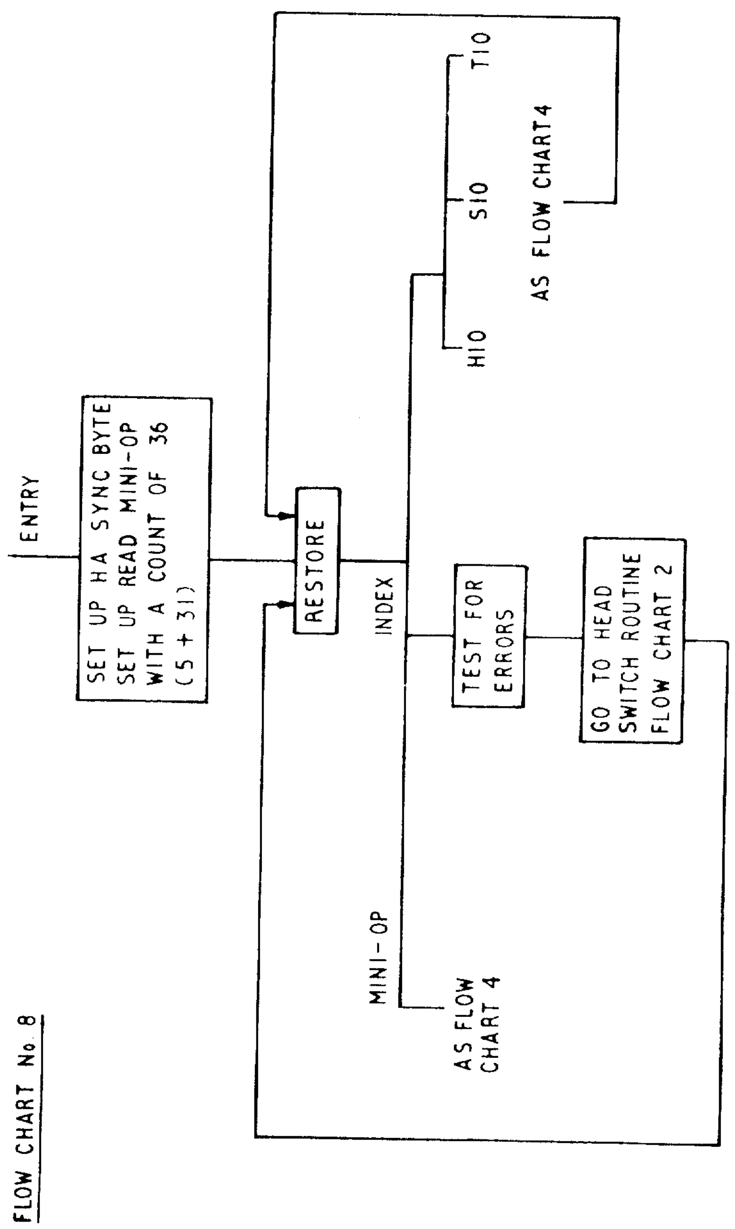

Records R1 to Rn contain the information written in the track. The format is identical to that of record zero. Each pair of records is separated by an inter record gap that serves to cushion variations which occur when the record is rewritten. The format is shown in FIG. 2*d*.

The fields are designated Count, Key and Data as for record RO. The inter Record gap between records has a minimum of 43 bytes. This value is increased to allow for variation during the rewriting of a record when the total number of information bytes in the key and data field exceeds a count of 20. One byte is normally added to the gap for each 23 bytes in the combined key and data fields.

The first 35 bytes (FF) of the gap are written by the post record zone of the previous record's data field and provides time for the microprogram to enter the next command.

The second record area of the inter record gap functions as the buffer area when rewriting the previous record. These bytes are written during the "inter record gap" zone at the start of a new record and are not written for the last record Rn. One byte of FF is written for each 23 byte increment over 23 contained in the previous record key and data fields.

As described above, each field of the record is divided into areas that define the operation sequence. In addition to the actual information area, zones are provided for the gaps between fields that allow for command chaining for prerecord synchronization and for the CCB's that follow each field. The various fields and zones are shown in FIG. 2c.

The zone A defines the fixed gap that is written between records. For the first record R0, the gap is part of the HA field. For subsequent records the gap is part of the Count field for the respective record.

The zone B defines the variable gap between records that may be added to the fixed gap (zone A).

The zone 1 defines the area of record recognition before transferring information. For records R1 to Rn this area contains the address member and sync byte.

The zone 2 defines the information area of the field. For HA and Count fields the length of the record is fixed. For Key and Data fields the lengths are set in their respective length registers in the count field.

The zone 3 contains the CCBs.

The zone 4 defines a fixed gap between fields that allows for command chaining.

In a preferred embodiment of the invention, the CPU includes a main store (not shown) for storing data and instructions. The main store also includes a control store (not shown) which stores microinstructions used for controlling the operation of the CPU. The control store has a number of locations assigned to the disk adapter. The CPU has local stores having registers which are allocated permanently to the disk adapter and registers in a working area of local store which can be temporarily used by the adapter. A control data register (CDR) stores the microinstruction which is currently controlling the CPU.

Figure 1B:
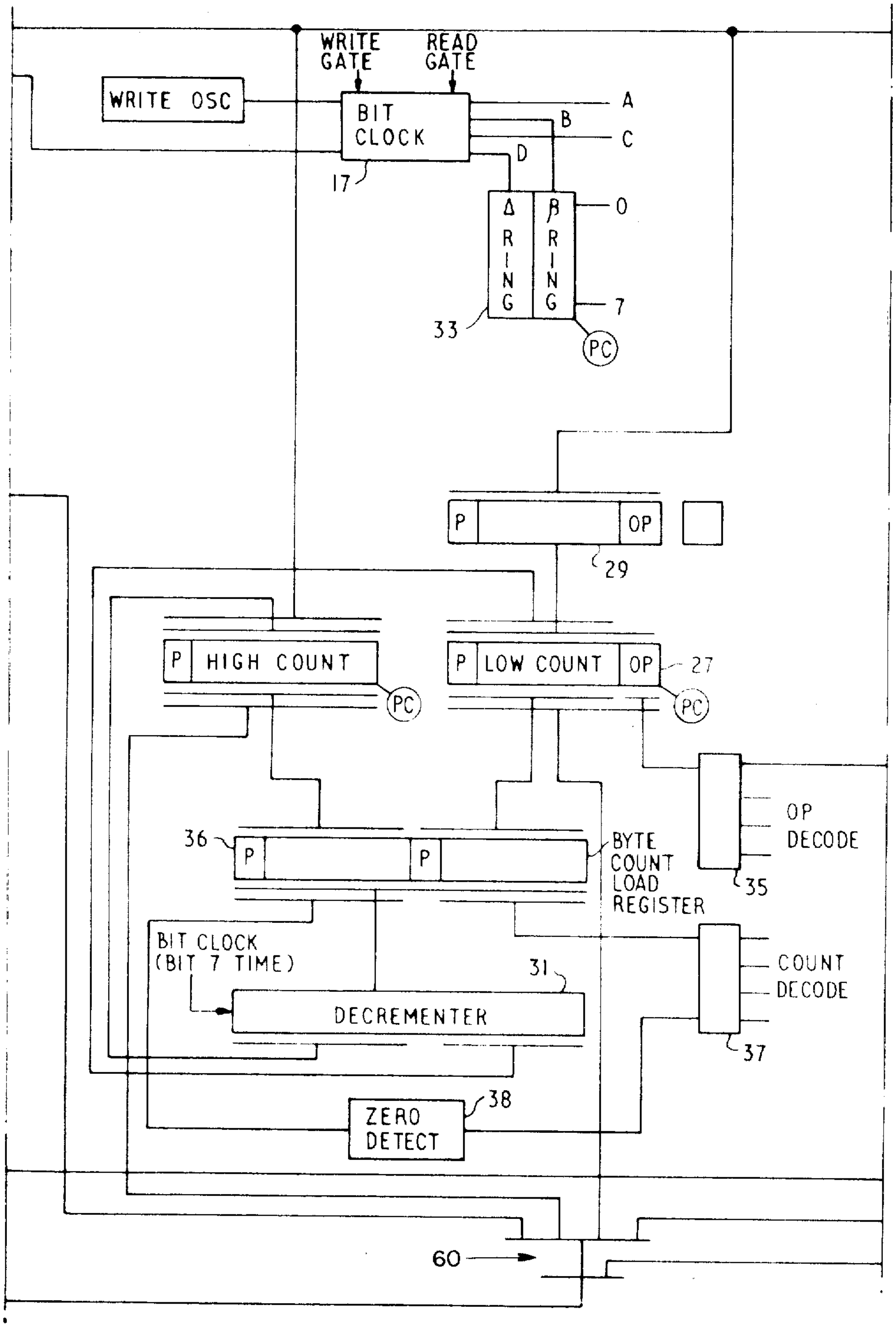
Figure 1C:
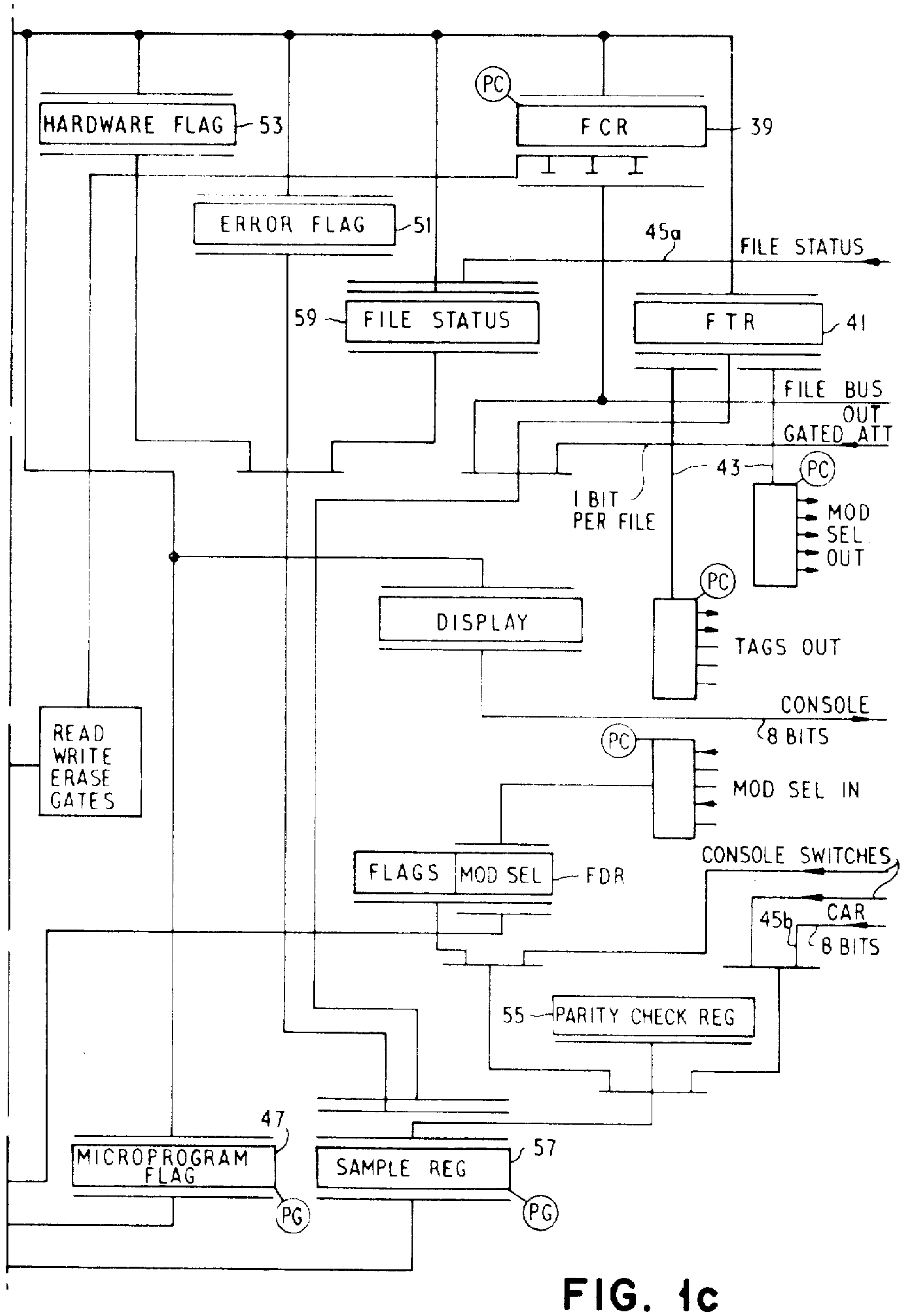

The invention will now be described by way of example with reference to FIGS. 1*a*–1*c* which show the data flow for an adapter or control unit. Data and control bytes are received from the CPU on the CPU bus 1. The data and control bytes originate in main or local stores of the CPU. A byte to be written on a file is placed in buffer register 3. The byte is serialized by means of B-register 7 and M-register 5. A byte is transferred to the M-register and the end bit is transferred to a selected file through write trigger 9 and gates 11. Trigger 9 inserts the clock bits and gate 11 selects the appropriate file module, only lines to two modules 101 and 102 are shown. A byte is serialized by transferring it from M-register to B-register with a shift of 1 bit right so that each bit of the byte appears at the end of the M-register.

Data from the file module (only two lines are shown) passes through gate 13 to data separator 15. The data separator produces a data stream, clock bit stream and an address mark byte detection signal. Clock bits are gated to bit clock 17. The clock bits are generated by the file during a read operation or by the write clock. The bit clock is gated by a read gate or a write gate pulse.

Fixed data such as AM bytes can be written on the file by forcing "ones" in "funnel" (or assembler) 19 or forcing zeros in the B-register or the M-register. Data from the separator 15 is entered into the extension MX of the M-register one bit at a time. Data is transferred back and forth between the M and B registers and shifted one bit on each complete cycle. In this way the serial data from the file can be deserialized. Once the byte is complete it is transferred from B-register to buffer register 3 and then to the CPU on BUS 25 via funnel 60.

Data read from the file including sync byte and CCBs can be compared by compare unit 21. Unit 21 compares the bit in the BX extension of the B-register with the bit at the opposite end of the B-register. This operation is performed to identify the sync byte and in all compare and scan operations. The byte to be compared is preloaded into the B-register using registers 3 and 5, before the serial data is received from the file.

The CCBs are generated during read and write operations by registers 23. Alternate bytes are X-ored together to generate CCB1 and CCB2 using registers XOR, CCB1 and CCB2, that is the byte currently in CCB1 is XORed with odd numbered bytes and CCB2 is XORed with even numbered bytes. Counter CCB4 adds the total number of sync and data bits written or read. CCB3 is an indication that CCB4 is to be generated or checked. The CCB's generated are written on the file during a write operation or compared with the CCBs read from the file during a read operation. An error bit pattern can be transmitted to the CPU if an error is detected.

The adapter is controlled as described in more detail later by means of mini-microinstructions called herein "mini-ops." Each mini-op consists of a three-bit op code and a 13-bit count. The count has an eight-bit high order portion and a five-bit low order portion. The mini-op is generated by the CPU microprogram and is transmitted by bus 1 to an eight-bit back-up register 29 while the current mini-op is in operations register 27. A back-up register need not be provided for the high order portion of the count if the next mini-op is available after the high order portion of the current count has been decremented to zero but before the lower order portion of the current count has been decremented to zero. A decrementer 31 controlled by a bit ring 33 decrements the count as each byte is read, written or counted out. The bit ring 33 is fed with pulses from bit clock 17. The bit clock pulses A, B, C, and D and bit ring pulses 0 to 7 time the operations of the adapter. A bit counter may be provided instead of bit ring 33.

The operation code and count of the mini-op is decoded by decoders 35 and 37, respectively. Decoders 35 and 37 may be provided by a ring decoder. The outputs of the decoders control the operation of the adapter.

Byte count load register 36 is provided for holding the counts during decoding. Zero detect unit 38 indicates that the high order count is zero.

Control and selection of the file module for addressing a particular track is advanced by a one-byte file control register (FCR) 39 and a register (FTR) 41 containing four control tag bits and four file module select bits. Outputs from the FCR are set into various registers of the file by using the appropriate select and tag bits on lines 43. The file module, typically an IBM 2314 disk file, includes a cylinder address register (CAR) (not shown), a difference register (not shown), a head address register (HAR) (not shown) and a number of control lines.

During a first cycle the CAR is set from FCR via FILE BUS OUT when a select cylinder tag is present in FTR. The appropriate file module select bits must also be present. The difference register is reset to "ones" by the setting of CAR.

During a second cycle, the difference register is set from FCR via FILE BUS OUT under control of a difference tag present in FTR. The module select bits are unchanged. The difference register is gated by pulses generated by the mechanical movement of the access arm of the selected file.

During a third cycle the HAR is set from FCR under control of head select tag in FTR.

After the various registers are set control data is set in the FCR and a control tag set in FTR. The control data in the FCR is as follows:

FCR bit 0 — Write gate. Enables write current to flow in selected head; head current direction set by Trigger 9. Write gate is used in conjunction with head select and Erase gate.

FCR bit 1 — Read gate. Energises the read amplifier in the selected file.

FCR bit 2 — Seek start. Resets detent latch if the difference register contents are non-zero. Mechanical motion of the access arm continues until difference is zero.

FCR bit 3 — Reset head register. Resets head address register of the selected file.

FCR bit 4 — Erase gate. Erase gate must be "on" when write is "on". Erase gate trims the newly written track on the selected file. Erase gate is normally trimmed off 18 seconds after Write gate.

FCR bit 5 — Select head. Select head bit is used to enable the head addressed by HAR during reading and writing.

FCR bit 6 — Return head to zero. The control tag and FCR bit 6 are enabled to initiate return of the head to track zero on the selected file.

FCR bit 7 — Head advance. This bit causes the head address register to be incremented by 1.

Inputs from the modules are received by the adapter on the File Bus In 45 which comprises lines *45a*, *45b*, and are gated to the CPU bus 25 by means of sample register 57 which generates parity. Gated attention lines GATED ATT indicate whether the file modules are ready for a read or write operation. File status lines *45a* of bus 45 indicate whether the files are operational and cylinder address lines *45b* indicate the contents of the cylinder address register. File status is set in latches 59. Facilities are also provided for display and console control over lines CONSOLE SWITCHES.

All the active file operations are initiated with a start I/O instruction. The actual operation to be performed is defined by the current CCW. Typical commands include Control, Write and Read.

Control commands include "no-operation," set file mask, recalibrate and seek. A no-operation command can be used to skip a record and for resetting an indication in the microprogram of the current orientation of the file. A set file mask command is used to insert a file mask that defines the permissible write and seek formations. A recalibrate command causes the selected file access arm to seek cylinder zero. A seek command causes the selected file arm to move to a new cylinder location and/or to set a new head selection.

Write commands include Write HA; Write RO; Write Count, key and data; Erase, Write data, and Write key and data. A Write HA command writes a new home address on the track after locating the index point. This is the only command that can be performed without a previous search of a continuing write sequence. Write RO writes the count, key and data fields of the RO track descriptor record. This command requires either a Search or a Write HA command in addition to a mask that allows writing RO. A Write Count, Key and Data (CKD) command writes a full record for records R1 to Rn. This command must be chained from a successful Search equal identifier or key command or chained from either a Write RO or Write CKD command. Whether the write command is allowed is determined by the file mask. The erase command is used to determine the amount of space available on a track and is similar to Write CKD. A Write data command writes the data field with new information from the CPU. The remainder of the record is unchanged. The count data length indicates the number of bytes.

Search commands fall into two groups. The search equal group is used for positive identification of a record area and is required for writing some sequences and some reading sequences, e.g., search HA equal. The Search high, and high or equal are normally used for table look up operations, e.g., Search key equal or high. The specified area from the track is compared with specific data from the CPU. The output of the compare unit 28 sets a "status modifier bit" when the result matches the operation. To ensure that all records in the track are searched a Read HA or Read RO command should precede the search. The search commands are not inhibited by the file mask.

All the read commands cause information read from a specified area of the record to enter the CPU storage. The read commands do not require a previous successful search to operate but a search is desirable with data records to ensure the reading of the desired record. Read commands are not inhibited by the file masks. Typical commands are: Read HA, Read count, Read data, Read key and data, Read C, K, D and Read RO.

As stated above, operation of the file attachment of adapter is initiated with the start I/O instruction. The CPU miroprogram controls the set up of the adapter. The start I/O defines the channel address and file module. Tests are made to determine if the file control unit or adapter is available for operation. The addressed file module is selected and tested to determine if it is ready. The address of the first CCW is read from the CAW. The command and the flags from the CCW are read. The flags are set in the adapter flag register 47. The CCW count and data address are set in local storage.

During this period the CPU is used for set up and cannot be used for other operations. Trap requests from other I/O devices are honoured except for short periods when priority is set by the microprogram. When the initial sequence is complete CPU control is released and file attachment or control unit continues with the selected file module.

A seek operation positions the access arm for use in data operations. When a head has to be moved the distance must be calculated and sent to the selected file module. The CCW count area and the data address define the location of the six byte track address. The address is compared against the last operating address stored in the file module. The microprogram returns to CPU functions after the seek operation has commenced. When seek is completed a trap or interrupt request is made by the share cycle and interrupt logic unit 49.

Data commands specify the function and the field to be processed. This may be the immediate approaching field or it may be after a skip of one or more fields. The command function is not started until the start of the required field is indicated. As each byte is required the control unit or adapter makes a share request to the CPU to transfer a byte. The request generated by unit 49 allows for a delay of a known number of microprogram cycles before acceptance. When the command is completed a trap request is made to the CPU for another command or to end the operation.

Most file operations require more than one command (CCW) to effect an operation. For this purpose a channel command chaining technique is used. A command sequence might contain a set file mask followed by a seek, and a search which can be repeated until a match is found. Finally read data or write data command is given to handle the data. Some commands cannot be performed without being chained to a successful search or a sequence that indicates record orientation. Each command must be successfully completed to allow further chaining. Otherwise status and sense conditions give an unusual condition signal that forces the ending routine to stop the chaining. The status and sense indicate the condition of the last command handled.

The ending operation occurs in a trap routine when the current command has been completed. Either an unusual condition is indicated or chaining flags indicate the end of a sequence. Referring now in more detail to the operation of the control unit or adapter shown in the diagram. The operation commences with a seek operation which is microprogram controlled by the CPU. The seek operation selects the file module, calculates the difference between the current cylinder address and the required cylinder address, loads the difference into the file difference register in module using appropriate tag, loads required cylinder address into CAR using appropriate tag bit, loads head address from head address byte of the command to HAR using appropriate tag bit, and loads start into CAR 39. The control unit or adapter is then free until mechanical motion of the file is complete. When the seek operation is complete or the operation timed-out an attention line signals the control unit. Each file module supplies an attention line which may be degated by an unselected file look out bit in register 47. An enabled attention line causes a microprogram interrupt and examination of file status before ending the operation.

Correct operation of the file module may be checked by comparing the track address written on the file in the HA field with the contents of the CAR in the module and the head address in local storage. Read HA and Read RO commence at index point and the CPU microprogram compares the track address from the HA field with the seek address as the field is scanned. Failure to compare generates a seek check. Any seek involving mechanical motion not followed by a Read or Write in the HA or RO fields will normally be followed by a Scan or Search command. Recognition of a searched for record is taken as evidence of a correctly accessed track.

An unsuccessful search over a track gives rise to a potential 'No record found' situation after the second detection of Index point. After this second detection of index point the CPU microprogram compares the track address from the HA field with the seek address. Failure to compare generates a Seek check.

A recalibrate command seeks Track O head O and may be initiated directly at the file by a control signal without any address transfer. To keep microprogram action to a minimum the contents of a head address in control store are not updated as a recalibrate command is followed by another seek command before any multitrack operation is attempted.

As stated above the adapter is controlled by mini-microinstructions or mini-ops during write, read and search CCWs. The record is divided into areas. Zones A and 1 or Zones A, B and 1 are defined as a gap area, and Zones 2, 3 and 4 are defined as a data area. The gap area, and the data areas for HA, Count key and Data fields are all treated differently. The adapter controls the operation while an area is being processed. A microprogram interrupt occurs at the end of each area and another mini-op takes over control. The CPU microprogram keeps track of areas during commands and during CCW chaining, and provides for mini-op sequences to space over unaccessed areas. The CPU microprogram examines each CCW and generates a sequence of mini-ops to execute that CCW. Accompanying each mini-op is a byte count that specifies the number of bytes to be read, written and/or timed out.

The adapter is controlled primarily by the contents of operations register 27 and write buffer register 3. The operations register contains the mini-op and the write buffer register 3 contains data used in operations in a gap area.

During write operation any byte within an area can be identified by a value of the byte count. During Read or Search operations any byte from the start of the data zone (zone 2) to the end of the post record gap can be identified.

Operations usually commence whenever a byte count and op code are loaded from back-up register 29 into operations register 27. The byte count is decremented during a data area and reaches a fixed value to indicate the end of data transfer and the start of CCB checking or generation. When the byte count indicates that the CCBs have been processed a microprogram interrupt is generated and the post-record gap is processed. The completion of the post-record gap is normally indicated by a byte count of zero. At a count of zero, the next mini-op is automatically loaded into register 27 from register 29. As stated a back-up register need not be provided for the high order portion of the count. If the next mini-op in the back-up register 29 is for a write operation in the gap area, the transfer of the mini-op to the operations register can take place when the byte count in register 27 is three.

There are four basic mini-ops used to control the file: write gap area, write data area, read data and No-op. Write data area can be a Non-format Write or a Format Write, read data can be modified to perform search data or scan operations. The four basic mini-ops can be modified by an additional bit or bits of the op code or by bits in register 47. One additional mini-op is provided for performing diagnostics on the file control unit or adapter.

In one control unit the mini-ops are defined by a three bit op code and two bits in register 47.

The operation codes are:

001 — Write gap area
011 — Write data area (Non format Write)
111 — Write data area (Formate Write)
010 — Read data
110 — Search data
000 — No-op
100 — Diagnostic op.

The byte counts for reads or writes for data areas are adjusted so that the byte count in register 27 is at a predetermined value for the first byte of the four cyclic code bytes. The predetermined value is a count of 31 in the present example. The CCBs are identified by byte counts 31, 30, 29 and 28. For Key and Data fields, the key length $K_L$ or data length $D_L$ is added to the predetermined value so that the byte count accompanying the mini-op is for example ($K_L$ or $D_L + 31$). When operating on the count field the byte count is $(9 + 31)$, and when operating in the HA field the byte count is $(5 + 31)$.

Write data area mini-ops are always preceded by the write gap area mini-op. The write gap area mini-op may write data defined by the contents of the write buffer 3 and the value of the byte count. No data transfer from storage occurs and the contents of the write is unchanged. Bytes are entered by the control unit directly from the write buffer 3 into the B and M-registers 7 and 5.

Write gap area mini-op will write N-7 bytes of FF followed by four bytes of 00 and three bytes of FF. The last two FF bytes are normally written with five clock bits missing and are referred to as 'Address mark bytes'. Bit 0 of the write buffer 3 governs whether or not the clock bits are to be left out.

The normal value of the byte count N is 15. N is larger when the gap is an interrecord gap, e.g., for the HA gap N is equal to 73 and for other interrecord gaps N is 17 + 1 byte for every 23 bytes over the first 23 bytes in the previous Key and Data fields.

A microprogram interrupt is generated at a byte count of 12 and when the byte count reaches zero a write data area mini-op is loaded from back-up register 29. At the same time the last four bits of the sync byte are transferred from buffer 3 to the B and M-registers. During write-gap mini-op bits band 7 of register 47 are used as follows:

Bit 6 = 1 — Start write gap on index
Bit 6 = 0 — Otherwise
Bit 7 = 1 — Write gap with AM
Bit 7 = 0 — Write gap without AM for erase.

The non-formate write data area mini-op writes the sync-byte data, CCBs and post-record gap. At the start of the op the B and M-registers contain the appropriate sync byte loaded by microprogram into the buffer 3 during the previous write gap area. While the sync byte is being written, the first data byte is transferred from storage to the buffer during a share cycle. Succeeding share cycles refill the buffer 3 as each data byte is written on the file. The CCBs are generated by the CCB registers 23.

The non-format write data area mini-op writes the first four bits of the sync byte as zeros and the second four bits from the buffer 3. The last four bits of the sync byte can be used to indicate whether the field which follows is HA, Count, Key or Data. The sync byte is followed by N—31 data bytes and four bytes of CCBs (counts 31, 30, 29 and 28). At byte count 28 a microprogram interrupt is given and two FF bytes are written (counts 27 and 26). The adapter continues to decrement at each byte time but no longer writes on the track. At count zero the next mini-op is set in the operations register.

The Format Write data area mini-op is identical to the non format write until the byte count is 26 when the file continues writing FF bytes until the write gap area mini-op is loaded at byte count 3. Write gap area mini-op is always loaded at count = 3, but cannot follow write gap area and non-format write data area mini-ops.

Prior to the end of a mini-op immediately preceding a read data mini-op, the CPU microprogram will have set up a byte of data (sync byte) in the buffer 3, the read data mini-op in the back up register 29. The read data mini-op commences when the value of the byte count for the preceding op is zero, the read op is loaded into register 27, the sync byte is set in the B and M-registers and a bit stream from the selected file is allowed to enter the data separator 15. At this time the bit and byte counters are disabled, and the data separator 15 and address mark detect logic are reset.

Each field contains two address mark bytes and a sync byte immediately preceding the data. All address mark bytes (AM bytes) are the same but the sync bit pattern can depend on the type of data field which follows it. Resetting of the address mark logic initiates an AM search which takes place in three steps:

1. Circuits monitor the incoming bit stream for a byte of zeros. Once this has been detected a variable frequency oscillator (VFO) is energized and is locked on to the incoming data during the next three bytes which must be zeros or the operation is restarted.

The separator then expects a byte of ones followed by two or more bytes of ones (AM bytes) each with the clock bits missing. If any of these conditions are not met the sequence restarts.

2. Once the AM bytes have been recognized the control unit waits for the next data bit before enabling counters to start deserializing the data. This particular bit must be bit 4 of the sync byte or the deserializing will be out of step, resulting in a data check.

3. The last four bits of the sync byte are then compared by unit 21 against the sync byte previously loaded by microprogram into the buffer 3. If the comparison is equal then a 'data block found' latch (not shown) is set and the read operation continues.

If the comparison was unsuccessful then the action taken depends on the value of sync byte loaded by the microprogram. If the sync byte is OE then the whole address mark search will be restarted, otherwise a microprogram interrupt will be generated and a wrong field mark bit will be set in register 51 (bit 3).

The setting of the data block found latch causes the bit stream from the selected file to be assembled by the B and M-registers as consecutive bytes, and placed in the buffer 3. When a byte of data has been placed in buffer 3 a share cycle is requested by share logic 49 and the assembled byte is transferred to local storage before the next byte is placed in buffer 3. While the data block found latch is on the assembled bytes are set in the CCB registers 23 and CCBs are generated to compare with the CCBs written on the file. When the byte count indicates that the data field has been exhausted a 'Share Cycle' latch (not shown) is turned off and the share cycles terminated. When the byte count indicates that the CCBs have all been read the data block found latch is reset, a microprogram interrupt generated and the error detecting circuits will indicate a data check if an error is detected.

The microprogram interrupt is given at byte count 28 after all the CCBs hav been read. The byte count is decremented until its contents equal zero (or three if the next mini-op is write gap area) and then the next mini-op is loaded from the back up register. During the period between byte count 28 and zero, the microprogram will load the next mini-op and count into the operating register, and the next sunc byte into the buffer 3.

The read operation described above is the one which occurs most frequently and bits 6 and 7 of microprogram flag register 47 are set to zeros. Bits 6 and 7 are called "modifier bits". An additional microprogram interrupt at byte count 33 to examine the home address field can be obtained if the modifier bits are set to 01. Bits 6 and 7 of register 47 are used as follows:

00 = straight read
01 = interrupt early for read/search HA field
10 = interrupt early for read/search count field
11 = space over field with data checking.

A microprogram interrupt at 38 can be obtained if the modifier bits are set to 10. This interrupt can be used to examine the count field. Share cycles can be suppressed allowing the read to space over a field if the modifier bits are set to 11.

Search and scan mini-ops are very similar to read mini-op. At the start of each op, the op code and count are loaded from the back up register, and the B and M-registers are loaded from the buffer 3 with the sync byte. The search mini-op sets a search satisfied bit in hardware flag register 53. A bit stream from storage is compared with the bit stream from the file bit by bit. The result of this comparison may reset the search satisfied bit. The type of condition which may reset the search satisified bit is controlled by bits 6 and 7 of microprogram flag register 47 as follows:

00 — File scan Equal
01 — Search Equal
10 — Search High
11 — Search High, Equal

If the CCW count = 0 before the end of the field a short search bit, in register 53, is set.

Code 00 in bits 6 and 7 specify a scan equal operation. However, a separate mini-op (code 101) may be provided for scan operations. In this case the code 00 in bits 6 and 7 of register 47 is not used but the codes 01; 10; and 11 are still used to indicate a Scan Equal, Scan High, and Scan Equal or High operations respectively.

The 'no-op' mini-op operates as follows:

1. Whenever an "end-of-op" microprogram interrupt is given, a latch (not shown) associated with back up register 29 is reset to zero. Whenever a new op and byte count is loaded by the microprogram into the back-up register the latch is set to one.

When the byte count = 3 the latch is tested:

*a.* if the latch is set to 1 the contents of the back up register are transferred to the op register when byte count is zero

*b.* if the latch is set to zero an overrun bit (bit 7 of error register 51) is set and the Operation register is reset to zeros (no op code and zero count).

2. To prevent a false "overrun" every sequence of mini-ops requested by the CPU microprogram must be terminated with a no-op mini-op with the byte count < 3.

3. Normally a no-op is associated with an initial byte count of zeros, the byte conter is inhibited and the op continually tests for the presence of a new op. If a non-zero initial byte count is loaded with no-op the count is decremented in the usual way and a microprogram interrupt is generated when the byte count is 28.

A no-op with a non-zero byte count is used to time the control signal to the file in a recalibrate command; and after index point to time the dropping the erase gate which controls erasing of the track edges, and to time raising the read gate which controls reading from a track.

The diagnostic op is used to check the control unit or adapter without running a file module. The op code, count and sync byte are loaded normally. When the op starts executing, the byte of data in the buffer 3 is converted to serial data and fed back to buffer and the byte reassembled. At this point an end of mini-op bit in register 53 is set and the write oscillator degated. The byte count and assembled data may now be examined by the microprogram to determine whether the control unit or adapter has functioned correctly. As soon as the end of mini-op bit is reset the operation is repeated for a further byte. This process continues until the byte count is exhausted.

Register 47 contains File microprogram flags as follows:

Bit 0 — Data chain
Bit 1 — Unselected file lock out
Bit 2 — Sili flag
Bit 3 — Skip down transfer
Bit 4 — Adapter (or control unit) reset
Bit 5 — control or main store
Bit 6 — } read/search modifers
Bit 7 — }

Bit 0 is the data chain flag from the current CCW. This is needed if the CCW count runs out during a field and if data chaining is indicated the adapter must be overrun.

Bit 1 is an unselected file lock out. If this flag is off then any drive which raises an attention line will cause a microprogram interrupt. If the flag is ON only the drive currently selected (if any) can cause an attention interrupt.

Bit 2 is the Sili flag which is used for incorrect length logic. (SILI is suppress incorrect length indication flag).

Bit 3 is the skip data transfer bit which can inhibit data transfer during share cycles to implement the skip function of a CCW.

Bit 4 adapter reset bit resets the adapter to a quiescent state.

Bit 5 indicates whether data transfer during a share cycle is to main or control store.

Bits 6 and 7 are modifier bits which have been described above.

Register 53 contains file hardware flags as follows:

Bit 0 — CPU interrupt

Bit 1 — Attention interrupt

Bit 2 — —

Bit 3 — Index interrupt

Bit 4 — End of op interrupt

Bit 5 — Unusual conditions

Bit 6 — Search satisfied

Bit 7 — Short search

Bits 0 to 4 provide information on the reason for the microprogram interrupt. The index interruptions are only from the selected file. Bit 3 is set each time the head passes index point and is reset by the microprogram.

Bit 5 indicates any condition which sets an error flag in register 51.

Bits 6 and 7 which relate to search operations have been described above.

Register 51 contains various error flags as follows:

Bit 0 — Invalid or Protected Memory Address IMA; PMA

Bit 1 — Data block Found

Bit 2 — Incorrect length

Bit 3 — Wrong field mark

Bit 4 — Bus Out Parity Check

Bit 5 — Adapter Parity Check

Bit 6 — Data Check

Bit 7 — Overrun

Bit 0 is set by share cycle hardware 49 is access to an invalid or a protected memory address is requested.

Bit 1 is used by the microprogram to determine if a recorded field runs on into the index mark.

Bit 2 gives the microprogram a valid indication of incorrect length at the end of the last data field operated by a CCW and is used in chaining. Bit 2 can be set:

1. When the count runs out during a mini-op and the SILI flag is off
2. When the count is not zero at the end of mini-op and the SILI flag is off, and
3. During data chaining, and count is not zero at end of op. SILI flag is ignored.

This error flag can result in a false indication or wrong length at the end of intermediate fields in a CCW command. The following cases are detected by microprogram:

*a.* SILI flag off. Wrong length will be indicated after count and key fields of a read count key and data CCW.

*b.* If SILI flag is on, a test for a count of zeros is necessary to space over remaining fields.

*c.* Data chaining required after a key field would give wrong length after count field.

Bit 3 — Wrong field mark indication has been described above.

Bit 4 — Bus out parity check on CPU interface causes a 'log out' and a microprogram trap.

Bit 5 — Indicates a parity check in any one of the positions of check register 55.

Bit 6 — The data check bit is set on during a read as a result of detecting mismatches in the CCBs read from the file with CCBs generated by the CCB registers 23. The bit set on during a write as a result of an error in main store.

Bit 7 — The overrun bit is set in three situations:

1. overrun on a share cycle operation
2. if a data chain request occurs in the middle of a field
3. If there is no valid data in operations register 27 when a new mini-op is required.

Data transfer operations to and from the file are controlled by three gates, namely read, write and erase gates. A read gate pulse allows a bit stream from a selected file into the adapter, and initializes data separation and address mark detection logic. The read gate is reset for read data and search data mini-ops when the count is 28.

A write gate pulse allows bits from the write trigger 9 to be written on a selected track. The write gate is set for write gap area and write data mini-ops. The write gate is reset when the mini-op is a non-format write and the byte count is 26, or the index point has been passed; or the adapter (or system) is reset, or if an adapter parity check occurs.

An erase gate pulse enables the edge of a newly written track to be trimmed. The erase head is physically located behind the write head so that the erase gate is reset later than the write head. The erase gate is set 'on' with the write gate for all write mini-ops, and is reset either when the byte count is 19 during a non-format write or at a predetermined time after the index point.

In another embodiment of the present invention operations register 27 consists of three portions of the count, the second portion stores a low order portion of the count and the remaining portion stores an 8 bit op code. The four basic mini-ops are defined by bits 0 and 1 as follows:

| bit 0 | bit 1 | |
|---|---|---|
| 1 | 0 | read data |
| 1 | 1 | write gap area |
| 0 | 1 | write data area |
| 0 | 0 | no-op |

Bits 2 to 7 of the operations register contains modifier bits as follows:

Bit 2 is an address mark bit which is used in conjunction with the write gap area mini-op. Address marker bytes are recorded during the execution of write gap commands. An erase command operates exactly like a write count key and data command except that the fields are not preceded by an address mark. Bit 2 is set on to inhibit writing of the AM. Bit 3 is a search bit used in conjunction with the read data mini-op to perform a search key command. The search bit gates on the compare unit 21 for serial data comparing. For search identifier (ID), (the identifier is the cylinder, head, record portions of a count field), or search HA commands, bit 3 is not set on as count and HA fields are compared in control store by the CPU microprogram.

Bit 4 is a scan bit used in conjunction with the read data mini-op to perform file scan command. The scan bit gates on the compare unit for serial comparing, gate the file mask byte on and inhibits compare on that byte.

Bit 5 is an index start bit which instructs the adapter to wait for index before performing this mini-op, e.g., if write HA is to be executed, a write gap area mini-op along with index start bit is set into the operations register. This instructs the adapter to wait for index to turn on the write gate. For a read HA CCW, a no-op along with the index start bit is set in the operations register. Bit 6 is a format bit used in conjunction with the write data area mini-op. On a non-format write, the write gate is reset after the CCBs. In the case of a formate write, the write gate remains on to write the variable gap between the data and count field. This format bit on indicates a format write. Bit 7 is a skip bit used in conjunction with read data mini-op for clocking over specified data areas without transferring data. For example, when a search ID is followed by a write CKD the key and data fields of that record must be clocked over. Clocking over the key and data fields is accomplished with a read data mini-op with the skip bit set on.

The control unit will execute read and write CCWs by generating a sequence of mini-ops for example a Read Count for Read HA CCW requires a sequence of three mini-ops while a Search ID followed by a write count key and Data CCW requires ten mini-ops. Each sequence depends on the actual CCW command issued and the two or more previous CCW's in a chain. The following are examples of CCW commands:

1. Read HA CCW

A sequence of three mini-ops is required to execute a read HA CCW as follows:

First mini-ops — no-op with a byte count of 43 — The adapter waits for index point before the count is decremented. Index point is indicated by the setting of bit 3 in register 53. At a byte count of 28 an interrupt is generated and the second mini-op read data, is set into the back up register and the HA sync byte set in the write buffer. At a byte count of zero the second mini-op is set in the operations register.

Second mini-op — read data with a byte count of 36 — With the read op in the operations register, the read gate is set on and an address mark search is initiated. After AM detection, decrementing of the count is started as the sync byte is transferred to the adapter. At a count of 28 an interrupt will occur to signal to the microprogram that the read has been completed and a no-op mini-op with count of zero is loaded into back up register. At a byte count of zero the no-op and count of zero are transferred to the operations register.

Third mini-op — no-op with a count of zero — All mini-op sequences end with this op and the adapter is placed in a reset state.

2. Write HA

A sequence of four mini-ops is required to execute a write HA CCW as follows:

First mini-op — write gap area with a byte count of 72 — The adapter waits for index before the count is decremented. At a byte count of 12, an interrupt occurs and the next op, write data area (format write), is placed in the back up register. The microprogram also sets the sync byte to be recorded into the write buffer. During byte counts seven to one bytes, four bytes of 00 and three bytes of FF are recorded. The last two bytes are AM bytes with five clock bits missing. At count of zero the second mini-op is set in the operations register.

Second mini-op — write data area (format write) with a byte count of 36 — After five bytes of HA and four CCBs have been written an interrupt occurs but the write gate is not reset. The next mini-op is loaded into the back up register and an index bit is set 'on'. At a count of zero, the mini-op is transferred to the operations register.

Third mini-op — no-op with a count of 34 — The adapter waits for index before the count is decremented so that the erase head is not reset and continues erasing to index. At index the count is decremented. At count of 28 a microprogram interrupt loads the fourth mini-op into the back up register and at a count of zero sets the fourth mini-op in the operations register.

Fourth mini-op — no-op mini-op with a count of 0 — This mini-op causes the adapter to be placed in a reset state.

3. Search ID - Write Data CCW

This CCW required five mini-ops. In this particular example the record contains a Key field which is not to be written.

First mini-op — read data mini-op with a count of 40 — When the count field sync byte is read the decrementing of the count commences. Nine bytes of the count field are read into local store. At a count of 28 an interrupt occurs. The microprogram will extract $K_L$ and $D_L$ from the count field (nine bytes), load the next mini-op, read data area with a count of $K_L + 31$, into the back up register and sets the modifier bits (or skip bit) to space over the key field. At a count of zero the next mini-op is set in the operations register. Note the value of $K_L$ obtained by reading the count field is stored in local store.

Second mini-op — read data with a count of $K_L + 31$ and with modifier bits on — The key field is spaced or clocked over. When AM bytes are detected the sync byte is compared and decrementing of the count continues. An interrupt occurs at a count of 28 and the next mini-op, write gap area with count of 15 is set in the back up register. When count is three, next mini-op is loaded into operations register.

Third mini-op — write gap area with a count of 15 — This writes a gap including the AM bytes preceding the data field. At count of 12 an interrupt occurs and the fourth mini-op write data area with a count of $D_L + 31$ is set in the back up register, the value of $D_L$ being obtained by the microprogram from control store. At a count of zero the fourth mini-op is loaded into the operations register as the sync byte is being written.

Fourth mini-op — write data area with a count of $D_L + 31$ — The count is decremented as the data bytes are written at counts 31, 30, 29 and 28 the CCBs are written and at count 28 an interrupt occurs which causes the fifth mini-op, no-op to be loaded into the back up register. At count zero the fifth op is loaded into the operations register.

Fifth mini-op — no-op with a count of zero — This op resets the adapter.

The particular byte counts described above depend on the format and the file characteristics, e.g., the density of data on the tracks must be taken into account. Some files have the facility for dual density recording, e.g., the file has high and low density operation characteristics. The gaps between fields have different lengths, e.g. the HA gap on low density recording is 36 bytes long whereas for high density recording the gap is 72 bytes long. The sync byte for all fields of the low density recording is OE but for the high density recording the sync bytes are coded as follows:

| | |
|---|---|
| HA | OD |
| RO Count | 08 |
| RO Data | 09 |
| R1-n Count | OE |
| R1-n Key | OA |
| R1-n Data | 09 |

The mini-op sequences are generated by the CPU microprogram. Flow chart 1 shows the overall microprogram routine. Point A is the idling point to which the microprogram always returns when an operation has been completed or after a system reset. Operation from this point commences with a microprogram interrupt. The microprogram interrupts include CPU, Index, Mini-op and Attention interrupt.

CPU interrupts are caused by System/360 instructions, Test I/O, START I/O and HALT I/O. The Test I/O interrupt checks the hardware and microprogram to determine the exact situation in the control unit or adapter. This results in a condition code and status being reported back to the CPU. A HALT I/O interrupt also examines the state of the adapter and reports back to the CPU. The START I/O reports back to the CPU immediately if an I/O operation cannot be started. An operation may not start if:

1. the adapter is busy; or
2. a device end operation is outstanding from a previous seek operation.

If an I/O operation can start, a branch on CCW command is made. There are more than 30 CCW commands, some of which have been described above. Flow chart 1 illustrates four typical commands: Read count key data (Read ckd); Read key data (Read kd); Search ID and read HA. These commands illustrate how portions of the data flow for two or more commands may be commanded. Considering the read ckd command, a branch on orientation of the track with respect to the head depends on whether or not the head is erasing or if it is not erasing. If the head is erasing then the microprogram exits to a "wait for index and finish erasing subroutine" to terminate erasing. This subroutine is shown in Flow chart 2 and will be described later. When the wait for index subroutine is completed or if the head was not erasing, a read count field subroutine is entered. This read is a "real" read that is the data in the count field is stored in main store. The read count field subroutine is entered by means of the entry for record RO or the entry for records Rl to Rn. The read count field subroutine is shown in Flow chart 3. After the count field has been read and stored in local storage it is transferred by the microprogram to main store. A check is then made to determine if operation is part of a data chain. A data chain only occurs if the CCW count has been fully decremented before the field has been read. If an error or check occurs during the transfer of data to main store a microprogram branch is made to an error routine (Flow chart 6) and the CSW is stored. If a data chain operation is to be carried out a microprogram branch and link instruction is used to enter the data chain subroutine. On return from the data chain subroutine a read key to storage subroutine is entered. This subroutine is entered directly if there is no data chaining.

The microprogram routine from this point onwards can be used for the read key data CCW. The read key CCW begins at the branch on CCW command. The branch on orientation of the disc has three possibilities:

1. the head is erasing;
2. the head is not erasing or has not read count field; or
3. the head has read the count field.

If the head is erasing the microprogram enters a wait for index and finish erasing subroutine (Chart 2). The microprogram then reads the count field, except when the count field has already been read, by entering the read count field subroutine. This is an implied read as the count field does not have to be transferred from local to main storage, i.e., the count is only required to indicate the length of the key and data fields.

The microprogram from this point on is "common" for both the read *ckd* and read *kd* CCWs. The read key to storage subroutine shown on Flow chart 4 reads the key field to storage. On return from the read key field subroutine a check is made to determine if there is data chaining. Also a check is made for errors such as incorrect length. Incorrect length means that the length specified by the CCW does not match with length of data read from the file. An error results in the termination of the operation and the microprogram enters error routine (Flow chart 6). The microprogram then continues and reads the data field to storage using the read data field subroutine shown in Flow Chart 5. On return from the read data field subroutine. A check is made to determine if there is data chaining and for errors. The microprogram from this point on is also common for the Search ID and Read HA CCWs. The search ID and Read HA microprogram routines commence at the branch on CCW.

The Search ID CCW has a branch on orientation which depends on whether the file is erasing or not. If the file is erasing the microprogram exits to wait for index and finish erasing subroutine. The Search ID microprogram continues by reading the count field and then compares the record just read with the programmers data. The status modifier bit is set if the search was satisfied. If status modifier bit is on, the command chain routine skips a CCW.

The Read HA routine does not require a branch on orientation but uses the wait for index subroutine. On return the microprogram enters the read HA subroutine described with reference to Flow chart 8. Lastly the Read HA microprogram routine transfers the HA field read into control store to main storage.

Both the Read HA and Search ID routines now return to a path which is also common to the Read CKD and Read KD commands.

At this point a check is then made to determine if there is command chaining. If there is command chaining the microprogram fetches next CCW and returns to the branch of CCW. The microprogram then continues with the next CCW.

If there is no command chaining the operation is terminated and the microprogram sets up a system I/O interrupt. At this time the microprogram loads the final mini-op of the sequence a no-op mini-op with a count of zero to prevent the adapter giving an overrun indication and to reset the adapter. The microprogram now returns to the idling point.

Many of the commands have very stringent prerequisites, e.g., a successful search or a write command must preceed a write command, except for a Write Home Address CCW. If the prerequisites are not satisfied the micoroprogram enters the error subroutine to terminate the operation with a system interrupt and return the microprogram to the idling point to await a new interrupt.

Referring to the beginning of Flow chart 1, the index interrupt occurs at index at the end of a format write data area mini-op. The microprogram sets up a mini-op with a count of 34 to time the last portion of erasing. The mini-op interrupt occurs from a no-op mini-op and the interrupt occurs at a count of 28. The microprogram stops erasing, tests for the need to give Control Unit End and for errors. Microprogram loads mini-op (no-op with count of zero). An Attention interrupt indicates that a seek has finished. A test is made for errors and a system device end interrupt is generated. Each of the interrupts index, mini-op and Attention returns the microprogram to the idling point A.

Flow chart 2 shows the wait for index and finish erasing subroutine. On entry (Entry 1) the microprogram sets up a no-op mini-op with a count of zero to reset the adapter. This prevents the adapter giving overrun indications. Branch on interrupt can occur as a result of passing index point, by a mini-op or by a CPU I/O instruction. There is also a head switch entry (Entry 2) into the index portion of the subroutine.

During an index point interrupt a check is made to determine if the CCW is performing a multitrack operation. A multitrack operation requires the switching from one head to another. This allows the programmer to switch from any one of the heads to the next sequential head without a seek command.

A multitrack operation is indicated by a multitrack bit in the CCW. If the multitrack bit is on, checks are made to determine if a seek command has been given and that the track is good. Errors result in the microprogram entering an error routine. If the index point has been passed the index bit is set. This part of the microprogram sets up a no-op with a count of 34 for turning off the erase head after index. A test can also be made to determine if the track is bad or if it is an alternative track. In this situation a multitrack switch is not permitted.

A mini-op interrupt checks for errors, resets the erase gate at a count of 28 and checks if it is a multitrack operation. If it is not a multitrack operation, a return is made to the calling routine. If it is a multitrack operation, a head switch is made to update the heads except when the head is at end of cylinder when an exit to the error subroutine is made.

The CPU interrupts can occur as a result of the SIO, TIO and HIO instructions. The SIO and TIO interrupts cause the microprogram to enter a routine which tells the CPU that the adapter is busy. The microprogram stores a CSW with the control unit busy status bit on. For the HIO interrupt the microprogram goes to the HIO subroutine described with reference to Flow chart 7. After completing the CPU interrupt the microprogram returns to restore and awaits a new interrupt.

Flow chart 3 shows the Read Count Field subroutine. There are two entry points to this subroutine. An entry is provided for records Rl to Rn and an entry is provided for record RO. Each entry sets up the orientation for its associated record and sets the appropriate sync byte in buffer 3. (Sync byte for record RO is 08 and for records Rl to Rn is OE). The microprogram then sets up Read mini-op with count of 41 in back up register of the adapter. The microprogram then restores and awaits a branch on interrupt.

The mini-op interrupt occurs at a byte count of 36. This allows the ID to be checked (bytes 0 to 5 of the count field). The mini-op interrupt normally occurs at a byte count of 28 but to allow the microprogram more time to check the count field checking of the identifier can commence at a byte count of 36. The mini-op interrupt portion of this subroutine tests for hardware detected errors such as overrun, module unsafe and module select checks and if there is an error exits to the error routine. If no error is detected by the hardware, the microprogram tests for a defective track or for a missing Address Mark. If a defective track is found or if an address mark was missed the subroutine exits to the error routine which terminates the operation with a system interrupt. If a defective track is not found and the address mark was good the present subroutine returns to the calling routine.

After an index interrupt the microprogram tests for errors. If an error is detected the microprogram exits to the error routine. If there are no errors, the microprogram goes to the head switch routine which is the second entry point of the wait for index and finish erasing subroutine. This allows time for the head to advance and the no-op mini-op allows time for the read amplifier to settle before the HA field is read. The microprogram returns to read count field subroutine and exits to the read HA subroutine described with the aid of Flow chart 6. On return from the read HA subroutine the microprogram checks if the operation is a multitrack op. If the op is a multitrack op, the microprogram tests for a bad track and then compares the cylinder and head address read from the HA field with the values in the CAR and local storage. If the track is bad and a mismatch occurs the microprogram exits to the error routine. If the track is good and a match occurs the microprogram continues by testing whether the CCW requires Record RO. This selects one of the two entries and the microprogram returns to restore. If the operation is not a multitrack op, the microprogram tests for a bad track and also makes the seek check. This checks if the cylinder is correctly addressed.

If the track is good and cylinder is correct the microprogram tests if CCW requires record RO and returns to one of the two entries.

The CPU interrupts are the same as shown on Flow chart 2 and the microprogram returns to the restore point.

Flow chart 4 illustrates the Read Key to Storage subroutine. This subroutine has a single entry. The microprogram tests if the Key length $K_L$ is zero. If the Key length is zero the microprogram returns to the calling routine. If the Key length $K_L$ is not zero the subroutine sets up the Key field sync bytes in the adapter buffer, and a read data mini-op with a count of $K_L + 31$ in the back up register. The subroutine then waits for an interrupt.

The mini-op interrupt occurs at a byte count of 28 and the microprogram tests for errors. If there is an error the subroutine exits to the error routine if not the subroutine returns to the calling routine.

If an index interrupt occurs, the error routine is entered. Under normal conditions an index point can not occur between the count and key fields. If it does occur while data is being read, then the data block found bit will ensure that a data error is indicated.

The CPU interrupts the handle as shown in Flow chart 3. The Read data field to storage subroutine is shown in Flow chart 5. Flow chart 5 has one entry and the microprogram tests if the Data length $D_L$ is zero if zero the microprogram sets a unit exception in the status bits, terminates chaining and goes to the error routine. If the Data length is non-zero the routine is the same as the read key to storage shown in Flow chart 4, except that the sync byte is for the Data field and the byte count is $D_L + 31$.

The Error routine is shown in Flow chart 6. This is a typical microprogram error routine. The Error conditions are examined and 'sense' bytes set up. The device and channel status are indicated. The microprogram also sets up a system End I/O interrupt, a no-op mini-op with a count of zero and restores the microprogram to the idling point A shown in Flow chart 1.

The HIO subroutine is shown in Flow chart 7. In this subroutine the microprogram sets up a flag in the adapter, terminates chaining and sets up a system end interrupt before returning to calling routine.

Flow chart 8 shows the read HA routine which is similar to the key to storage routine except that the HA sync byte is set in the adapter buffer and the read mini-op has a count of 36. The mini-op interrupt can occur at a byte count of 31 to allow more time for the CPU to compare the Home Address field. In addition the index interrupt goes to the wait for index subroutine head switch entry before returning to the restore point.

The above description of the microprogram routines for generating the mini-op sequences shows how micro-instruction routines for executing CCWs may be commoned.

This is achieved by bringing the various CCW routines into the common routine as soon as possible and by branching to subroutines which can be called by any CCW routine. By this method each CCW routine would consist of a series of subroutine calls with only a small number of individual microinstructions for housekeeping.

Summarizing the microprogram routines described above, after each branch on CCW command a check must be made to see that all the prerequisite conditions have been satisfied, e.g., the file mask set or a successful search achieved. This information can be obtained from the flag bytes in the adapter which keep a record of the history within a CCW chain sequence.

The first mini-op sequence depends on the orientation of the file, which can be erasing, between HA and RO, between count and key fields; between key and data fields, between data and count, and not known. When the file is erasing it must continue to index point. When index point is reached, the erase gate must be reset and a head switch may be required. It is possible for an HIO interrupt to occur during a subroutine this is handled by a second level subroutine (HIO subroutine shown in Flow chart 7). On return from the HIO subroutine the calling subroutine awaits for a mini-op interrupt. It is possible to get an SIO or a TIO interrupt during a subroutine both these store a CSW with a control unit busy status, and restore to await the end of mini-op.

With a read key or data, or key and data, CCW it is necessary to read the count field to obtain the key and data field lengths. This means that for all orientation states other than between count and key, the next count field (other than RO) must be read, but not transferred to main storage.

If an index point is reached while looking for a count field a head switch may be required and the HA must be read and compared against the current head position to check against incorrect seeking. During the HA subroutine the head switch subroutine may be called which in turn may call the HIO subroutine. This gives a possibility of four levels of microprogram.

Having read the count field the adapter has enough information to skip the key field or to read the key field into store under the control of the CCW count and skip flag. The microprogram checks for incorrect length and to establish if the incorrect length is a true situation.

The point labeled A is the point to which the microprogram restores when it has finished a command sequence. (Other than completing final erasing of a format write or presenting a stacked channel end). If an SIO interrupt occurs at A, then the adapter Busy Flag will be on if an erase is still in progress or if a channel end is stacked the HIO flag will be on.

If there has been a unit check condition since the last TIO there will be a contingent connection to the file which had the condition. This connection holds off interrupts from other devices and causes the adapter to appear to be busy to an SIO, until the connection is broken.

The rest of SIO routine is concerned with checking the device and clearing any outstanding Device End and forming a Contingent Connection if there are any checks, setting up a Program Controlled interrupt if requested, resetting the sense information and performing the branch on CCW op code.

At A an index point interrupt can only occur if the adapter is busy (e.g., still erasing). If it is erasing, a mini-op will be set up to time the reset of the erase gate. Any errors at this time will have already reset the erase gate, and if there is no stacked interrupt an interrupt will be created with a unit check and control unit end in the status.

An end of mini-op at A can only occur as a result of the mini-op set up at index point to time the resetting of erase gate.

A gated attention interrupt at A can only occur if the adapter is not busy. This interrupt is used to generate Device End after a seek CCW, and when a device is ready. The masking of attention interrupts is also affected by contingent connections.

There are two levels of interrupt and the various causes at each level are listed below:

High Priority: Index point and End of mini-op

Low Priority: CPU, Attention and microprogram request to lower priority.

We claim:

1. In a data processing system having a microprogrammed processor, having a unit storing each of a plurality of data records in a plurality of serially accessed field locations separated by gap locations, and having a memory for storing different write commands, different read commands and different search commands, for controlling the transfer of data between the processor and the storing unit, a control unit comprising means for receiving from the processor predetermined sequences of control words from a group consisting of read data, write data, write gap and no-op control words, word by word, for said read, write and search commands and including an operation register for storing each control word, word by word as it is received, each control word having an operation code portion and a count portion, means responsive to the operation code portion of each read data control word, write data control word and write gap control word while it is in the operation register for selectively transferring data between only a predetermined one of said locations and the control unit serially by bit, means responsive to said operation code portion of each read data and write data control word while it is in the operation register for transferring said data between the processor and the control unit by bit group, means responsive to the operation code portion of each no-op control word while it is in the operation register for inhibiting data transfer between one of said locations and the control unit, means for periodically decrementing the count portion of each read data control word, write data control word, write gap control word and no-op control word while it is in the operation register, means for terminating the data transfer for each read data control word, write data control word and write gap control word when its decremented count is at a first value, and means effective when the decremented count in each control word is at a second value for rendering the receiving means effective to receive a next succeeding control word in the sequence containing the control word in the operation register.

2. A system as claimed in claim 1 wherein the control unit includes a backup register storing at least a part of said next succeeding control word until the decremented count of the control word in the operation register is at said first value.

3. A system as claimed in claim 2 wherein the control unit includes an additional register for holding said count portion of each control word prior to each periodic decrementing.

4. A system as claimed in claim 3 wherein the control unit includes a buffer having a capacity equal to the data bit group for storing data transferred between the storing unit and the control unit and between the control unit and the processor.

* * * * *

PO-1050
(5/69)

UNITED STATES PATENT OFFICE
CERTIFICATE OF CORRECTION

Patent No. 3,771,13? Dated November 6, 1973

Inventor(s) Michael J. Heneghan et al

It is certified that error appears in the above-identified patent and that said Letters Patent are hereby corrected as shown below:

On the cover page, under "References Cited - United States Patents", add the following references:

| | | | |
|---|---|---|---|
| 3,399,394 | 08/1968 | Smith | 340/172.5XR |
| 3,408,631 | 10/1968 | Evans et al. | 340/172.5 |
| 3,573,854 | 04/1971 | Watson | 340/172.5 |
| 3,290,648 | 12/1966 | Smeltzer | 340/172.5XR |
| 3,374,467 | 03/1968 | Cast et al. | 340/172.5 |
| 3,487,370 | 12/1969 | Goshorn et al. | 340/172.5 |

In the specification, column 11, line 18, "(Formate" should read --(Format--; line 65, "non-formate" should read --non-format--.

Signed and sealed this 22nd day of October 1974.

(SEAL)
Attest:

McCOY M. GIBSON JR.
Attesting Officer

C. MARSHALL DANN
Commissioner of Patents